(12) United States Patent
Kito et al.

(10) Patent No.: US 12,436,340 B2
(45) Date of Patent: Oct. 7, 2025

(54) OPTICAL FILTER DEVICE

(71) Applicant: KOHOKU KOGYO CO., LTD., Nagahama (JP)

(72) Inventors: Katsuya Kito, Nagahama (JP); Katsuhiro Iwasaki, Nagahama (JP); Tomoaki Kiriyama, Nagahama (JP)

(73) Assignee: KOHOKU KOGYO CO., LTD., Nagahama (JP)

( * ) Notice: Subject to any disclaimer, the term of this patent is extended or adjusted under 35 U.S.C. 154(b) by 182 days.

(21) Appl. No.: 18/252,588

(22) PCT Filed: Nov. 5, 2021

(86) PCT No.: PCT/JP2021/040855
§ 371 (c)(1),
(2) Date: May 11, 2023

(87) PCT Pub. No.: WO2022/102548
PCT Pub. Date: May 19, 2022

(65) Prior Publication Data
US 2024/0004138 A1    Jan. 4, 2024

(30) Foreign Application Priority Data
Nov. 13, 2020    (JP) .................... 2020-189628

(51) Int. Cl.
*G02B 6/293*    (2006.01)
*G02B 6/26*    (2006.01)
(Continued)

(52) U.S. Cl.
CPC .......... *G02B 6/2937* (2013.01); *G02B 6/264* (2013.01); *G02B 6/2848* (2013.01);
(Continued)

(58) Field of Classification Search
CPC .. G02B 6/02042; G02B 6/264; G02B 6/2848; G02B 6/29361; G02B 6/2937; G02B 6/32
See application file for complete search history.

(56) References Cited

U.S. PATENT DOCUMENTS 7,218,811 B2 * 5/2007 Shigenaga ............... G02B 6/32
385/39
9,794,016 B2 * 10/2017 Li ......................... H04J 14/052
(Continued)

FOREIGN PATENT DOCUMENTS

| JP | H0572411 A | 3/1993 |
| JP | 2001264572 A | 9/2001 |

(Continued)

OTHER PUBLICATIONS

International Search Report (PCT/ISA/210) with translation and Written Opinion (PCT/ISA/237) Mailed on Jan. 18, 2022, by the Japan Patent Office as the International Searching Authority for International Application No. PCT/JP2021/040855. (9 pages).

*Primary Examiner* — Daniel Petkovsek
(74) *Attorney, Agent, or Firm* — BUCHANAN INGERSOLL & ROONEY PC

(57) ABSTRACT

An optical filter device includes: a first multi-core optical fiber including a plurality of first cores; a first lens; an optical filter which is rotated by a rotation angle about a rotation axis; a second lens; and an optical fiber including cores which the emission light beams from the second lens enter. When directions directed from a reference axis toward one side and another side with respect to the reference axis along an orthogonal axis orthogonal to an optical axis and the reference axis are defined as first and second orthogonal directions, respectively, a circumferential orientation of the first multi-core optical fiber is set so that a separation distance is minimized. The separation distance is a sum of distances from the reference axis to first cores that are most (Continued)

separated away from the reference axis in the first and second orthogonal directions, respectively.

6 Claims, 22 Drawing Sheets

(51) Int. Cl.
    *G02B 6/28*          (2006.01)
    *G02B 6/32*          (2006.01)
    *G02B 6/02*          (2006.01)

(52) U.S. Cl.
    CPC ........... *G02B 6/29361* (2013.01); *G02B 6/32* (2013.01); *G02B 6/02042* (2013.01)

(56) References Cited

U.S. PATENT DOCUMENTS

2003/0174937 A1*   9/2003   Huang ................. G02B 6/2937
                                                            385/47
2015/0168642 A1     6/2015   Mimura et al.

FOREIGN PATENT DOCUMENTS

| JP | 2004264739 | A | 9/2004 |
|---|---|---|---|
| JP | 2005172976 | A | 6/2005 |
| JP | 5598882 | B2 | 10/2014 |

\* cited by examiner

OPTICAL FILTER DEVICE

TECHNICAL FIELD

The present invention relates to an optical filter device.

BACKGROUND ART

Internet communication traffic demands are increasing year by year, and optical communication has been desired to achieve higher speed and larger capacity. Hitherto, in order to respond to those demands, a wavelength division multiplexing (WDM) technology, a digital coherent technology, and other technologies have been used to promote an increase in transmission capacity.

In recent years, as a new multiplexing technology, a space division multiplexing (SDM) technology using a multi-core optical fiber is gathering attention. It is said that the SDM technology allows further higher speed and further larger capacity to be achieved.

Along with the progress of research and development of the SDM technology, demands for an optical isolator, an optical filter device, or other devices using the multi-core optical fiber have been increased. Here, as the optical filter device, there has been known, for example, a device in which a multi-core optical fiber, an optical filter formed of a dielectric multilayered film, and an optical fiber (typically, a multi-core optical fiber) having the same number of cores as that of this multi-core optical fiber are arranged in the stated order along a certain axis. This optical filter has, for example, a function of allowing a light beam in a specific wavelength band to pass therethrough. The light beam emitted from each core of the multi-core optical fiber enters an incident surface of the optical filter, passes through the optical filter, and enters a corresponding core of the optical fiber (see, for example, Patent Literature 1).

CITATION LIST

Patent Literature

[PTL 1] JP 5598882 B2

SUMMARY OF INVENTION

Technical Problem

In such an optical filter device, when the optical filter is arranged so that its incident surface is parallel to a plane orthogonal to the axis, there is a possibility that the light beam emitted from the multi-core optical fiber is reflected by this incident surface. Such reflected light is generally referred to as "reflected return light." The reflected return light has a possibility of entering a transmission-side communication device via the multi-core optical fiber or being reflected multiple times so that an optical characteristic of signal light is reduced.

In view of the above, hitherto, reduction of the reflected return light has been performed by arranging the optical filter so that the incident surface of the optical filter is tilted with respect to the plane orthogonal to the axis.

However, when the optical filter is tilted as described above, the reflected return light can be reduced, but variation is caused in transmission loss of a light beam which has been emitted from each core of the multi-core optical fiber and has passed through the optical filter. Thus, there is a possibility that the optical signal is not appropriately transmitted.

Now, a specific description is given with reference to FIG. 25A and FIG. 25B. FIG. 25A is a graph for showing transmission loss characteristics of a certain optical filter device. This optical filter device includes two multi-core optical fibers each including seven cores, and an optical filter arranged between those two multi-core optical fibers. The two multi-core optical fibers have the same configuration. Specifically, one of the seven cores extends as a center core along a center axis of the multi-core optical fiber. The remaining six cores are positioned at vertices of a regular hexagon having the center core as a center, and extend as surrounding cores along an axial direction. As the optical filter, a short-wave-pass optical filter (optical filter for allowing a light beam in a band of wavelengths shorter than a specific wavelength to pass therethrough) is used. The optical filter is tilted.

As shown in FIG. 25A, a cutoff wavelength of this optical filter is about 1,520 nm. FIG. 25B is a graph obtained by enlarging a part in which the transmission loss starts to increase in FIG. 25A. Among the four solid lines in the graph of FIG. 25B, a solid line 101 positioned on the shortest wavelength side (left side) indicates a transmission spectrum of emission light emitted from a certain surrounding core, and a solid line 102 positioned on the longest wavelength side (right side) indicates a transmission spectrum of emission light emitted from another certain surrounding core. In this example, transmission spectra of a plurality of surrounding cores are substantially the same and are shown in an overlapping manner, and hence the number of transmission spectra (solid lines) in the graph is not equal to the number of cores.

The transmission spectra shown in FIG. 25B are each shifted to a shorter wavelength side as compared to transmission spectra (not shown) of emission light emitted from corresponding cores in a case before the optical filter is tilted. However, a shift amount of each transmission spectrum varies for each core. In this example, the shift amount of the transmission spectrum 101 is maximum, and the shift amount of the transmission spectrum 102 is minimum. When each transmission spectrum is shifted as described above, as compared to the case before the optical filter is tilted, a maximum value of variation in the transmission spectra (that is, variation between the transmission spectrum positioned on the shortest wavelength side and the transmission spectrum positioned on the longest wavelength side) is increased. In this example, the maximum value of the variation in the transmission spectra (cutoff wavelength) at the time when the transmission loss is 3 dB is about 0.6 nm.

As described above, when the transmission spectrum varies in each core, variation is caused in transmission loss of emission light emitted from each core in any certain wavelength. When the variation in the transmission loss is increased, variation is caused in intensity of the light beam propagated through each core of the optical fiber (in this example, the multi-core optical fiber). As a result, there is a possibility that the optical signal is not appropriately transmitted. As shown in FIG. 25B, the variation in the transmission loss becomes larger as the maximum value of the variation in the transmission spectra is increased. Accordingly, in order to appropriately transmit the light beam which has passed through the optical filter through use of the optical fiber, it is important to reduce the maximum value of the variation in the transmission spectra.

The present invention has been made to solve the above-mentioned problem. That is, the present invention has one object to provide an optical filter device capable of appropriately transmitting an optical signal while reducing reflected return light.

Solution to Problem

According to one embodiment of the present invention, there is provided an optical filter device (10) including: a first multi-core optical fiber (20) which has a pillar shape, and includes a plurality of first cores (C1 to C7) extending along an axial direction, and a common cladding (21) surrounding the plurality of first cores (C1 to C7); a first lens (30) having an optical axis (z-axis) positioned on a center axis of the first multi-core optical fiber (20), the first lens being configured to collimate a light beam diverging after being emitted from each of the plurality of first cores (C1 to C7), and to collect the collimated light beams which have been emitted from the plurality of first cores (C1 to C7), respectively; an optical filter (40) having a first surface (40a) which light beams exiting from the first lens (30) enter, and a second surface (40b) which is opposed to the first surface (40a), and from which the light beams passing through the optical filter exit, the optical filter being configured to allow a light beam in a specific wavelength band to pass therethrough at any transmission intensity, the optical filter being rotated by a predetermined rotation angle ($\eta$) about a rotation axis (r1) extending in a specific direction perpendicular to the optical axis (z-axis) of the first lens (30), from a position at which the first surface (40a) is parallel to a plane (xy plane) orthogonal to the optical axis (z-axis); a second lens (50) configured to converge each of the light beams exiting from the optical filter (40), which have been emitted from the plurality of first cores (C1 to C7), respectively; and an optical fiber (60) which has a pillar shape, and includes cores which all of the light beams exiting from the second lens (50), which have been emitted from the plurality of first cores (C1 to C7), respectively, enter, and extends along the axial direction.

In the optical filter device (10), when a direction directed from a reference axis (y-axis) which passes through the optical axis (z-axis) and is parallel to the rotation axis (r1) toward one side with respect to the reference axis (y-axis) along an orthogonal axis (x-axis) orthogonal to the optical axis (z-axis) and the reference axis (y-axis) is defined as a first orthogonal direction (−x-axis direction), and a direction directed from the reference axis toward another side with respect to the reference axis (y-axis) along the orthogonal axis is defined as a second orthogonal direction (+x-axis direction), a circumferential orientation of the first multi-core optical fiber (20) is set so that, when an end face (20a) of the first multi-core optical fiber is viewed along the center axis (z-axis) of the first multi-core optical fiber, a separation distance is minimized, the separation distance being a sum of a distance from the reference axis (y-axis) to a first core (first separated core) that is most separated away from the reference axis (y-axis) in the first orthogonal direction (−x-axis direction) and a distance from the reference axis (y-axis) to a first core (second separated core) that is most separated away from the reference axis (y-axis) in the second orthogonal direction (+x-axis direction).

The optical fiber including the cores which "all of the light beams which have been emitted from the plurality of first cores, respectively, enter" means an optical fiber including cores which allow emission light beam emitted from each core of the first multi-core optical fiber to enter the cores. That is, the reflected return light is not included in the above-mentioned "all of the light beams."

Further, in this specification, "collecting light" means that a lens collects light beams (strictly speaking, principal rays of the light beams) emitted from a plurality of light sources (for example, the plurality of first cores of the first multi-core optical fiber) to one point, and "converging (focusing) light" means that a lens reduces a diameter of a light beam emitted from one light source (for example, each first core of the first multi-core optical fiber) so as to focus the light beam to one point.

Advantageous Effects of Invention

According to the present invention, it is possible to appropriately transmit the optical signal while reducing the reflected return light.

DESCRIPTION OF EMBODIMENTS

First Embodiment

Figure 1:
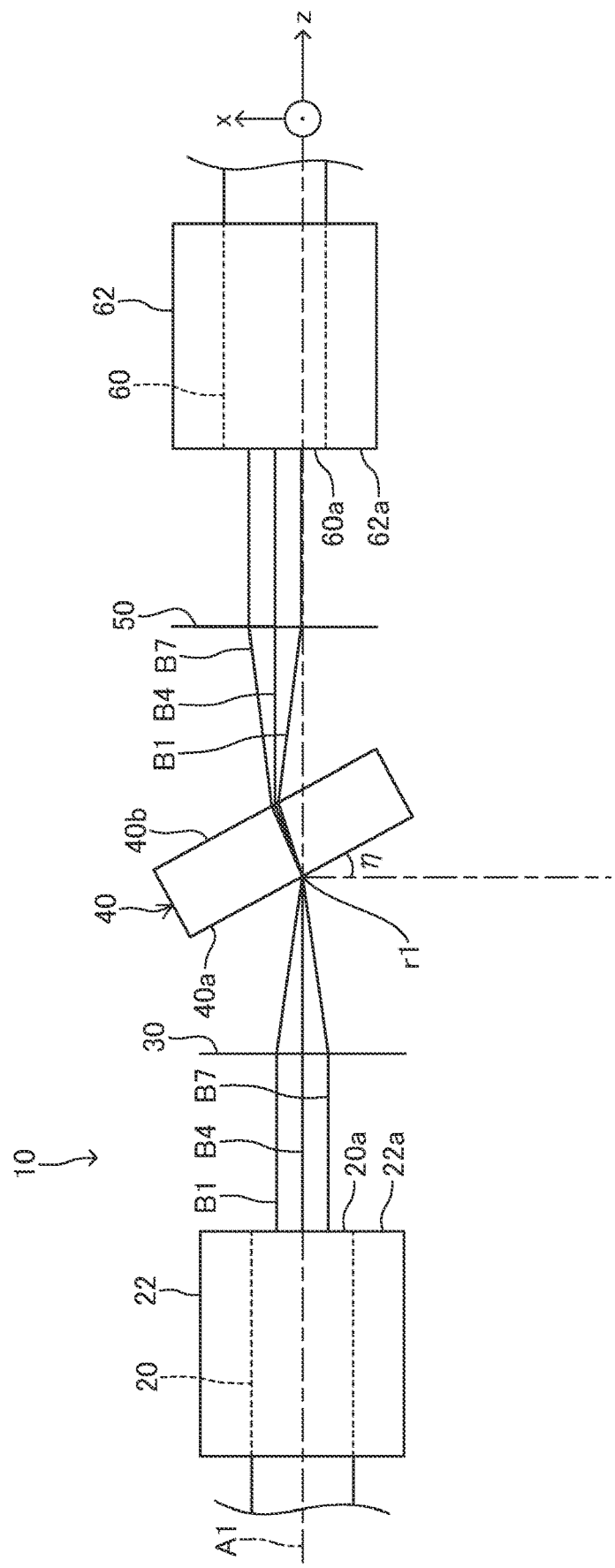
FIG. 1 is a plan view of an optical filter device according to a first embodiment of the present invention.

FIG. 1 is a plan view for illustrating an example of an optical filter device 10 according to a first embodiment of the present invention. As illustrated in FIG. 1, the optical filter device 10 includes a multi-core optical fiber 20 serving as a first multi-core optical fiber, a first lens 30, an optical filter 40, a second lens 50, and a multi-core optical fiber 60 serving as an optical fiber. Those members are arranged in the above-mentioned order along an axis A1. An orthogonal coordinate system is set in the optical filter device 10. The z-axis extends on the axis A1 so that a direction directed from the first lens 30 toward the optical filter 40 corresponds to a positive direction. The y-axis is orthogonal to the z-axis (that is, the axis A1), and extends so that a front direction of the drawing sheet (an oncoming direction) corresponds to a positive direction. The x-axis is orthogonal to the z-axis and the y-axis. In the following, the multi-core optical fiber is also referred to as "MCF." In this specification, in order to make the drawings easily visible, specific members (for example, the MCF 20 and the MCF 60) are illustrated with their dimensions, angles, and the like being changed.

Figure 2:
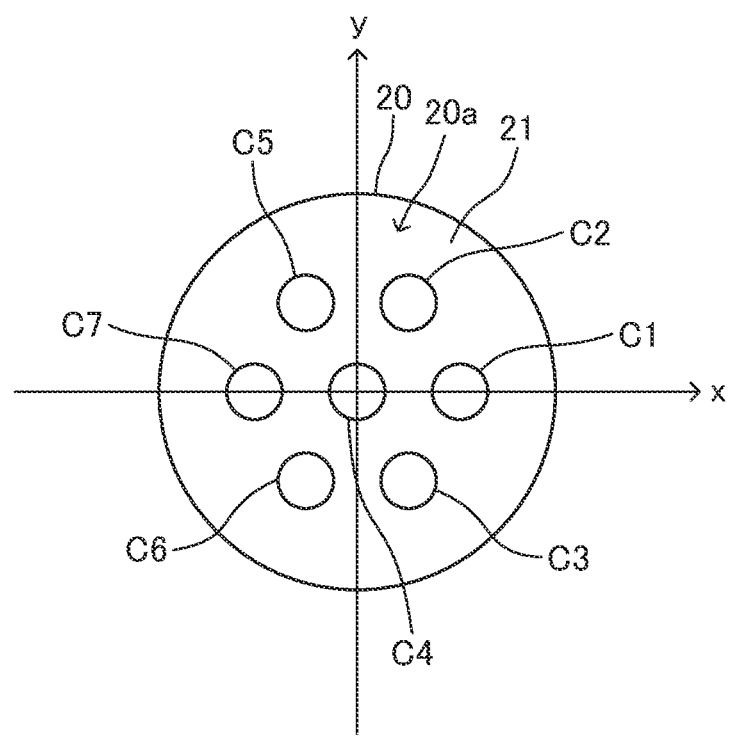
FIG. 2 is a view for illustrating an end face of a multi-core optical fiber functioning as an emission member.

The MCF 20 has a columnar shape, and a center axis of at least an end portion of the MCF 20 in the +z-axis direction matches the axis A1. An end face 20a of the MCF 20 is parallel to a plane (xy plane) orthogonal to the axis A1. FIG. 2 is a view for illustrating the end face 20a of the MCF 20. As illustrated in FIG. 2, the MCF 20 includes seven cores C1 to C7 each serving as a first core, and a common cladding 21 surrounding those cores C1 to C7. The core C4 extends along the center axis of the MCF 20 (hereinafter also referred to as "center core C4"). The cores C1 to C3 and C5 to C7 are positioned at vertices of a regular hexagon having the center core C4 as a center, and extend along the axial direction (hereinafter also referred to as "surrounding cores C1 to C3 and C5 to C7"). In other words, the surrounding cores C1 to C3 and C5 to C7 extend along axes excluding the center axis of the MCF 20. A distance (core pitch) between adjacent cores is 38 μm. The cores C1 to C7 and the cladding 21 are made of glass containing quartz as a main component. A refractive index of each of the cores C1 to C7 is larger than a refractive index of the cladding 21. The MCF 20 is a single-mode optical fiber. The MCF 20 is an example of a multi-core optical fiber to be used in the optical filter device 10 (described later). The material of the cores C1 to C7 and the cladding 21 is not limited to glass containing quartz as a main component, and the cores C1 to C7 and the cladding 21 may be made of other materials. Further, in this specification, a column includes one having a curved axis.

As illustrated in FIG. 1, an end portion of the MCF 20 in the +z-axis direction is inserted into and held by a ferrule 22 having a cylindrical shape. An end face 22a of the ferrule 22 is positioned on the same plane as the end face 20a of the MCF 20. The reason therefor is because, under a state in which the MCF 20 is inserted into the ferrule 22, the end face 20a of the MCF 20 is collectively polished together with the end face 22a of the ferrule 22. In FIG. 1, the MCF 20 inside of the ferrule 22 is indicated by the broken line, but illustration of the cores C1 to C7 is omitted.

Light beams propagated through the respective cores C1 to C7 of the MCF 20 are emitted from the end face 20a toward the first lens 30. That is, the MCF 20 functions as an emission member. In FIG. 1, among the light beams emitted from the respective cores C1 to C7, only principal rays of the light beams emitted from the cores C1, C4, and C7 (see FIG. 2) are illustrated. Light beams B1, B4, and B7 correspond to principal rays of emission light beams emitted from the cores C1, C4, and C7, respectively. The principal rays of the emission light beams emitted from the respective cores C1 to C7 are parallel to each other (see the light beams B1, B4, and B7 of FIG. 1), but each emission light beam is divergent light which diverges as the light progresses.

The first lens 30 is an aspherical lens having a focal length of 2.5 mm. A center axis (optical axis) of the first lens 30 is positioned on the axis A1. The first lens 30 collimates (makes parallel) a light beam diverging after being emitted from each of the cores C1 to C7. In other words, for example, the first lens 30 collimates a light beam diverging after being emitted from the core C1 (in FIG. 1, only a principal ray B1 thereof is illustrated). That is, the first lens 30 is a so-called collimator lens. The first lens 30 collects the light beams collimated as described above, which have been emitted from the respective cores C1 to C7, to a focal point (in FIG. 1, only the light beams B1, B4, and B7 are illustrated). In the following, the light beam collimated as described above is also referred to as "collimated light (parallel light)."

The optical filter 40 is a short-wave-pass optical filter. The short-wave-pass optical filter is a well-known optical filter formed of a dielectric multi-layer film, and hence a detailed description thereof is omitted. The optical filter 40 includes an incident surface 40a serving as a first surface, and an exit surface 40b serving as a second surface opposed in parallel to the incident surface 40a. The light beam exiting from the first lens 30 enters the incident surface 40a. The optical filter 40 is arranged so that the focal point of the first lens 30 is positioned on the incident surface 40a. Accordingly, the light beams emitted from the respective cores C1 to C7 are collected on the incident surface 40a via the first lens 30, and pass through the optical filter 40 so as to exit from the exit surface 40b. A lens to be arranged between the MCF 20 and the optical filter 40 is not limited to the first lens 30, and the lens is only required to be a lens capable of substantially collimating the emission light emitted from each of the cores C1 to C7 of the MCF 20. For example, the lens may be a spherical lens or a GRIN lens.

The optical filter 40 includes a rotation axis r1 extending in the y-axis direction at a position at which the axis A1 intersects with the incident surface 40a (that is, the focal point of the first lens 30). The optical filter 40 is rotated by a rotation angle "η" about the rotation axis r1 from a position at which the incident surface 40a is parallel to the plane orthogonal to the axis A1. A magnitude of the rotation angle "η" is 0°<η<90°. Thus, the reflected return light is reduced. In the following, it is defined that, when the optical filter 40 is viewed from the +y-axis direction (that is, when the optical filter 40 is viewed from a direction as illustrated in FIG. 1), the rotation angle "η" obtained when the optical filter 40 is rotated counterclockwise about the rotation axis r1 has a positive value, and the rotation angle "η" obtained when the optical filter 40 is rotated clockwise about the rotation axis r1 has a negative value.

In the example illustrated in FIG. 1, when the optical filter 40 is viewed from the +y-axis direction, the optical filter 40 is rotated counterclockwise by the rotation angle "r". Accordingly, the position of the light beam exiting from the exit surface 40b is positioned in the +x-axis direction with respect to the position of the light beam entering the incident surface 40a. All of the light beams exiting from the optical filter 40, which have been emitted from the respective cores C1 to C7 (in FIG. 1, only principal rays are illustrated), are collimated light (parallel light), but the principal rays progress in directions in which the principal rays separate away from each other (see the light beams B1, B4, and B7 of FIG. 1). The principal ray B4 exiting from the optical filter 40 is parallel to the axis A1.

The second lens 50 is an aspherical lens having a focal length of 2.5 mm. The second lens 50 is shifted by a predetermined distance in the +x-axis direction so that the principal ray B4 exiting from the optical filter 40 progresses along a center axis (optical axis) of the second lens 50. The second lens 50 is arranged at a position separated away by the focal length in the +z-axis direction from an intersection (not shown in FIG. 1) of the principal rays of the respective emission light beams exiting from the optical filter 40. The second lens 50 refracts the light beams exiting from the optical filter 40, which have been emitted from the respective cores C1 to C7, so that the principal rays thereof become parallel to each other (see the light beams B1, B4, and B7 of FIG. 1). Further, the second lens 50 converges each of the light beams emitted from the respective cores C1 to C7 (only the principal rays are illustrated in FIG. 1).

The MCF 60 has the same configuration as that of the MCF 20. That is, the MCF 60 has a columnar shape, and includes seven cores (not shown) extending along the axial direction, and a common cladding (not shown) surrounding those cores. The MCF 60 is a single-mode optical fiber. A center axis of at least an end portion of the MCF 60 in the −z-axis direction matches the center axis of the second lens 50. The end portion of the MCF 60 in the −z-axis direction is inserted into and held by a ferrule 62 having a cylindrical shape. Under a state in which the MCF 60 is inserted into the ferrule 62, an end face 60a of the MCF 60 is collectively polished together with an end face 62a of the ferrule 62. Thus, the end face 60a of the MCF 60 and the end face 62a of the ferrule 62 are positioned on the same plane (xy plane). In FIG. 1, the MCF 60 inside of the ferrule 62 is indicated by the broken line.

The end face 60a of the MCF 60 is located at a position at which each of the light beams emitted from the respective cores C1 to C7 is converged. Thus, each of the light beams exiting from the second lens 50, which have been emitted from the respective cores C1 to C7, enters a corresponding core of the MCF 60 with low loss. That is, the MCF 20 and the MCF 60 are optically coupled to each other via the optical filter 40 through use of the first lens 30 and the second lens 50. A lens to be arranged between the optical filter 40 and the MCF 60 is not limited to the second lens 50, and may be, for example, a spherical lens or a GRIN lens. Further, when the MCF 20 is replaced with another MCF having a different number of cores and/or a different core arrangement, it is preferred that the MCF 60 be also replaced with another MCF having the same number of cores and the same core arrangement as those of the replaced MCF. Moreover, the MCF 60 functions as a light receiving member for receiving emission light exiting from the second lens 50, but the light receiving member is not limited to the multi-core optical fiber. For example, the light receiving member may be a single-core optical fiber group including the same number of single-mode single-core optical fibers as the number of cores of the MCF 20 (seven in the example of FIG. 1). In the single-mode single-core optical fiber, each core is surrounded by an individual cladding.

The above description corresponds to the description related to the configuration of the optical filter device 10.

In the optical filter device 10 described above, when the optical filter 40 is rotated about the rotation axis r1, although the reflected return light can be reduced, variation in transmission spectra (in particular, the maximum value of the variation) of the light beams emitted from the respective cores C1 to C7 of the MCF 20 is increased. When the variation in the transmission loss in any certain wavelength is increased, there is a possibility that an optical signal cannot be appropriately transmitted by the MCF 60. The reason therefor is considered to be because, when the optical filter 40 is rotated, variation in incident angles "a" to the optical filter 40 of the light beams emitted from the respective cores C1 to C7 is increased.

Figure 3:
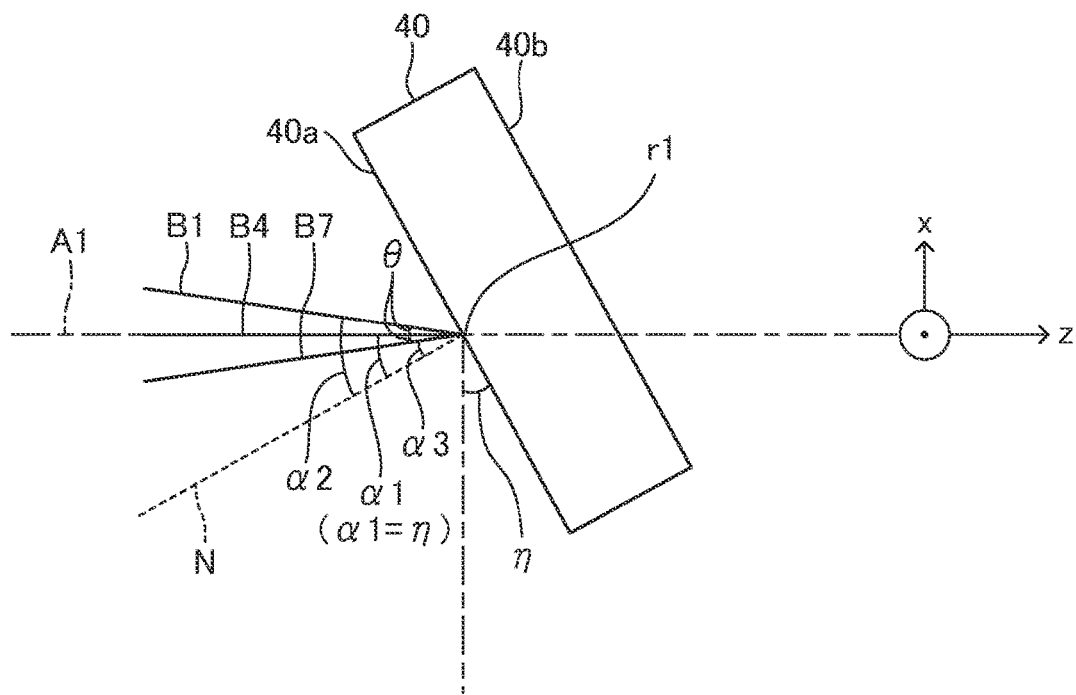
FIG. 3 is a view for illustrating an incident angle "a" and a light beam angle "$\theta$" of a principal ray entering an optical filter.

A specific description is given with reference to FIG. 3. FIG. 3 is a view for illustrating incident angles "α" (α1, α2, and α3) of the respective principal rays B4, B1, and B7 entering the optical filter 40 (description of an angle "θ" is given later). In FIG. 3, illustration of principal rays passing through the optical filter 40 and then exiting from the exit surface 40b of the optical filter 40 is omitted. As illustrated in FIG. 3, when the optical filter 40 is rotated counterclockwise by the rotation angle "η" (η>0) about the rotation axis r1, a normal N of the optical filter 40 rotationally moves counterclockwise by an angle "η" from the axis A1. Thus, the incident angle α1 of the principal ray B4 (light beam emitted from the core C4) becomes equal to the angle "η" (α1=η). Further, the incident angle α2 of the principal ray B1 (light beam emitted from the core C1) becomes larger than the incident angle α1 (α2>α1), and the incident angle α3 of the principal ray B7 (light beam emitted from the core C7) becomes smaller than the incident angle α1 (α3<α1). In contrast, when the optical filter 40 is not rotated (that is, when the incident surface 40a is parallel to the xy plane), the incident angle α2 and the incident angle α3 are equal to each other (α2=α3) owing to the symmetric property of the core C1 and the core C7 with respect to the core C4. That is, when the optical filter 40 is rotated, variation between the incident angle α2 and the incident angle α3 is increased. It is considered that similar variation is caused also in incident angles "α" of the light beams emitted from the cores C2, C3, C5, and C6.

In view of the above, the inventors of the present application have examined a relationship between an incident angle "α" of a light beam entering the optical filter 40 and a wavelength shift amount Δλ (described later) of a transmission spectrum of this light beam, to thereby discuss a circumferential orientation of the MCF 20 (and MCFs 120 and 220 to be described later) capable of reducing the maximum value of the variation in the transmission spectra. Details are described below.

Figure 4:
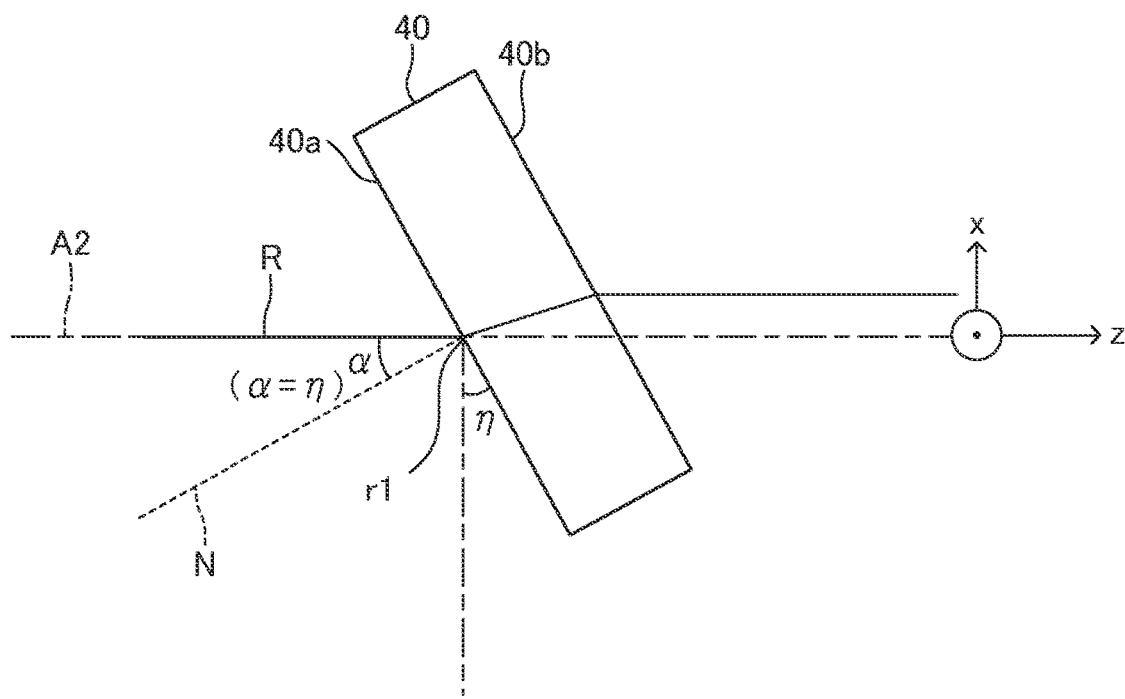
FIG. 4 is a plan view of an optical filter prepared so as to examine a relationship between the incident angle "$\alpha$" and a wavelength shift amount $\Delta\lambda$, and is a view for illustrating a state in which a light beam R passes through the optical filter.

FIG. 4 is a plan view of the optical filter 40 prepared so as to examine the relationship between the incident angle "α" and the wavelength shift amount Δλ. A light beam R enters the incident surface 40a of the optical filter 40 along an axis A2. The light beam R passes through the optical filter 40 so as to exit from the exit surface 40b. The optical filter 40 can be rotated by the rotation angle "n" about the rotation axis r1 with respect to a plane orthogonal to the axis A2. Thus, the incident angle "α" of the light beam R becomes equal to the rotation angle "η". The inventors of the present application measured the transmission loss of the light beam R exiting from the optical filter 40 at the time when the rotation angle "η" was changed in units of 0.5° in a range of −2.5°≤η≤2.5° (in other words, when the incident angle "α" of the light beam R was changed in units of 0.5° in a range of −2.5°≤α≤2.5°).

Figure 5:
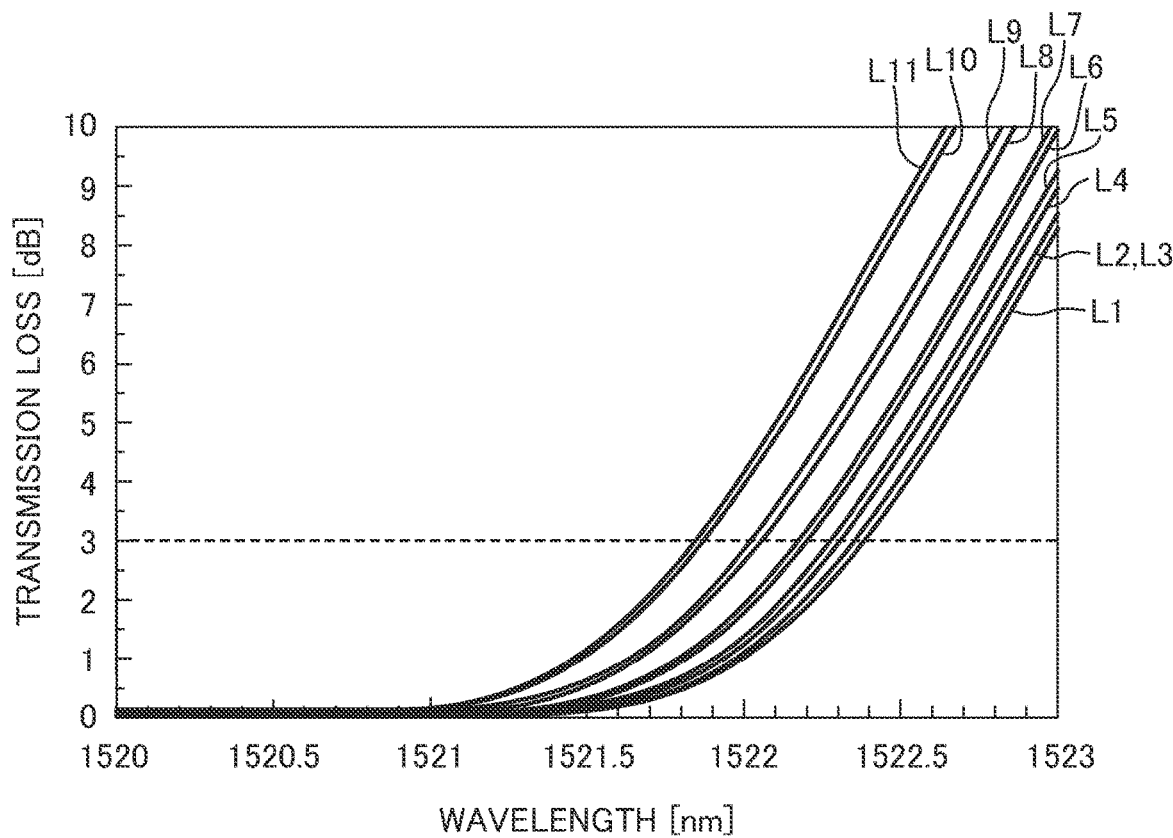
FIG. 5 is a graph for showing transmission loss characteristics which are based on measurement using the optical filter of FIG. 4.

FIG. 5 is a graph for showing the transmission loss characteristics which are based on the above-mentioned measurement. In the graph, a solid line L1 indicates a transmission spectrum of a light beam R having an incident angle α=0°, and solid lines L2 and L3 indicate transmission spectra of light beams R having incident angles α=0.5° and −0.5°, respectively. Solid lines L4 and L5 indicate transmission spectra of light beams R having incident angles α=1° and −1°, respectively, and solid lines L6 and L7 indicate transmission spectra of light beams R having incident angles α=1.5° and −1.5°, respectively. Solid lines L8 and L9 indicate transmission spectra of light beams R having incident angles α=2° and −2°, respectively, and solid lines L10 and L11 indicate transmission spectra of light beams R having incident angles α=2.5° and −2.5°, respectively. The transmission spectra L2 and L3 are substantially the same, and are illustrated in superimposition with each other.

As shown in FIG. 5, when the magnitudes (absolute values) of the incident angles "α" are equal to each other, behaviors of the transmission spectra are similar to each other (for example, the solid line L10 and the solid line L11). Further, all of the transmission spectra L2 to L11 are shifted to a shorter wavelength side from the transmission spectrum L1, and the shift amount thereof is increased as the magnitude of the incident angle "α" is increased. In the following, a shift amount in wavelength by which each of the transmission spectra L2 to L11 is shifted from the transmission spectrum L1 at the time when the transmission loss is 3 dB (that is, a transmittance of 50%) is defined as "wavelength shift amount Δλ." That is, the wavelength shift amount Δλ is "a shift amount in wavelength of a transmission spectrum of a light beam having an incident angle 'α' from a transmission spectrum of a light beam having an incident angle 0°, at the time when the transmission loss is 3 dB."

Figure 6:
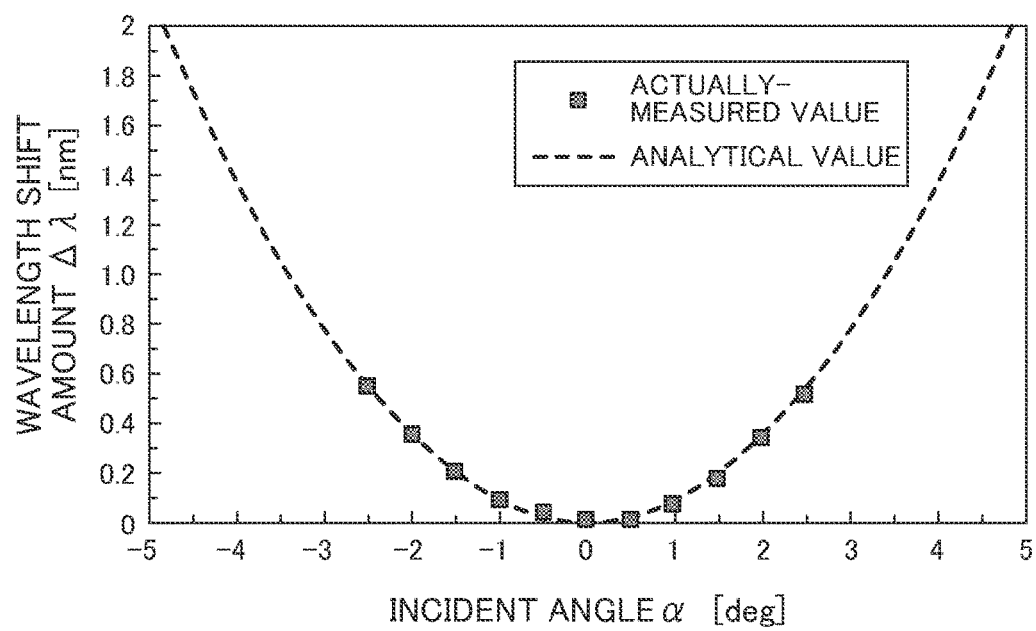
FIG. 6 is a graph for defining the relationship between the incident angle "a" and the wavelength shift amount $\Delta\lambda$.

FIG. 6 is a graph for defining the relationship between the incident angle "α" and the wavelength shift amount Δλ. The eleven actually-measured values in the graph are values plotted based on the graph of FIG. 5. Further, FIG. 6 also shows results obtained by calculating the relationship between the incident angle "α" and the wavelength shift amount Δλ based on the following analytical expression (1). Here, the analytical expression (1) is derived with reference to the following document.

Mitsunobu Kobiyama, "Optical Thin-Film Filter Design," First Edition, The Optronics Co. Ltd., 2006, pp. 301-346

$$\Delta\lambda = \lambda_0 \left\{ 1 - \sqrt{1 - \left(\frac{n_1}{n_2}\sin\alpha\right)^2} \right\} \quad (1)$$

In the analytical expression (1), $\lambda_0$ represents a cutoff wavelength (=1522.4 nm) at the time of the incident angle α=0°, $n_1$ represents a refractive index in air (=1.0), and $n_2$ represents a refractive index of the optical filter 40. The refractive index $n_2$ is set to $n_2$=1.65 in order to fit the analytical values to the actually-measured values. With reference to the graph of FIG. 6, the analytical expression (1) satisfactorily matches the behaviors of the actually-measured values. Accordingly, in the following discussion, the wavelength shift amount Δλ is to be calculated based on the analytical expression (1). Further, with reference to the analytical expression (1), the wavelength shift amount Δλ is increased as the magnitude of the incident angle "α" is increased.

In this example, the wavelength shift amount Δλ is defined as a shift amount in wavelength at the time when the transmission loss is 3 dB, but the present invention is not limited thereto. For example, the wavelength shift amount Δλ may be defined as a shift amount in wavelength at the time when the transmission loss is 2 dB, 4 dB, or 5 dB. The reason therefor is as follows. As shown in FIG. 5, in a range in which the transmission loss is at least from 2 dB to 5 dB, the transmission spectra L1 to L11 are substantially parallel to each other, and hence the shift amount in wavelength of each of the transmission spectra L2 to L11 is substantially the same as the wavelength shift amount Δλ at the time when the transmission loss is 3 dB (that is, the shift amount satisfactorily matches the analytical expression (1)).

Figure 7A:
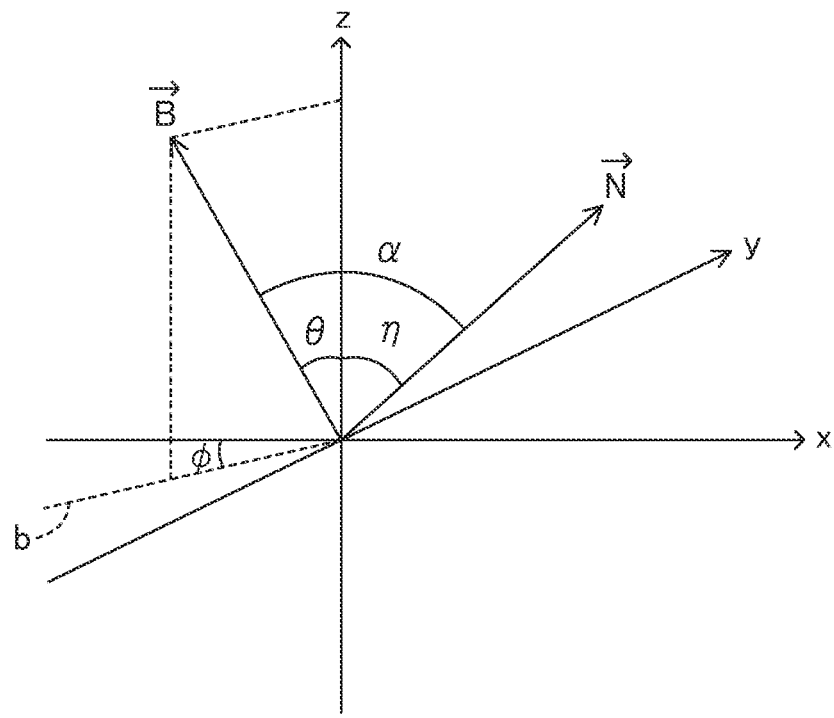
FIG. 7A is a diagram for illustrating a relationship among the incident angle "$\alpha$", a rotation angle "$\eta$" of the optical filter, the light beam angle "$\theta$", and an angle "$\phi$" of each core in an orthogonal coordinate system.
Figure 7B:
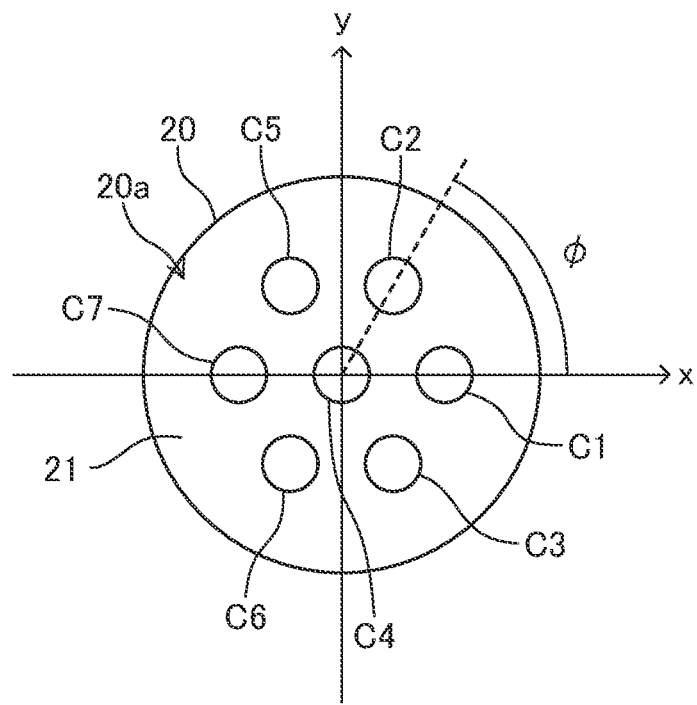
FIG. 7B is a view to be used for describing a method of calculating the angle "$\phi$".

Incidentally, the incident angle "α" can be derived from "the rotation angle 'η' of the optical filter 40," "the light beam angle 'θ' (see FIG. 3) formed as an acute angle by the light beam exiting from the first lens 30 and the axis A1," and "an angle 'ϕ' (described later) of each of the surrounding cores C1 to C3 and C5 to C7." Description is given with reference to FIG. 7A and FIG. 7B. FIG. 7A is a diagram for illustrating the relationship among the incident angle "α", the rotation angle "η", the light beam angle "θ", and the angle "ϕ," in the orthogonal coordinate system, and FIG. 7B is a view for illustrating the end face 20a of the MCF 20. As illustrated in FIG. 7B, the angle "ϕ" of any surrounding core is defined as an argument. The argument is an angle from a positive part of the x-axis to a line segment connecting between the origin and a center of any surrounding core. In the example of FIG. 7B, the angles "ϕ" of the surrounding cores C1, C2, C5, C7, C6, and C3 are 0°, 60°, 120°, 180°, 240°, and 300°, respectively. The angle "ϕ" is not defined for the center core C4. In FIG. 7A, the angle "ϕ" is illustrated as an angle which increases counterclockwise from a "negative" part of the x-axis as viewed from the +z-axis direction. The reason therefor is because the light beam emitted from each of the surrounding cores C1 to C3 and C5 to C7 of the MCF 20 is refracted by the first lens 30.

A vector B of FIG. 7A is a light beam vector representing a light beam progressing from any of the cores C1 to C7 via the first lens 30. When a half line extending from the origin in the direction of the angle "ϕ" is defined as a half line "b", the light beam vector B is positioned on a plane including the half line "b" and the z-axis, and forms the light beam angle "θ" with a unit vector "ez" (not shown) extending in the +z-axis direction. Accordingly, the light beam vector B can be expressed by the following expression (2).

$$\vec{B} = \begin{pmatrix} -\sin\theta\cos\varphi \\ -\sin\theta\sin\varphi \\ \cos\theta \end{pmatrix} \quad (2)$$

A vector N of FIG. 7A is a normal vector from the exit surface 40b of the optical filter 40. The normal vector N is positioned on a zx plane, and forms the rotation angle "η" with the unit vector "ez." In FIG. 7A, the normal vector N is defined as a normal vector from the exit surface 40b, and is opposite to the direction of the normal N illustrated in FIG. 3 and FIG. 4. The reason therefor is because an easier description is allowed when the angle formed between the normal vector N and the unit vector "ez" extending in the +z-axis direction is defined as the rotation angle "r". It should be noted that the angle has the same value as that of the rotation angle "η" illustrated in FIG. 3 and FIG. 4. The normal vector N can be expressed by the following expression (3).

$$\vec{N} = \begin{pmatrix} \sin\eta \\ 0 \\ \cos\eta \end{pmatrix} \quad (3)$$

The incident angle "α" is an angle formed between the light beam vector B (expression (2)) and the normal vector N (expression (3)). Accordingly, with reference to the definition of inner product, the incident angle "α" can be derived by the following expression (4).

$$\alpha = \cos^{-1}(\cos\eta\cos\theta - \sin\eta\sin\theta\cos\phi) \quad (4)$$

The light beam angle "6" of the light beam emitted from the center core C4 is 0°, and hence, when the incident angle "α" of the light beam emitted from the center core C4 is to be calculated, the value of the second term in the parentheses of the expression (4) becomes 0 (because the value of sin θ becomes 0). That is, in this case, the angle "ϕ" is not included in the expression (4). Accordingly, there is no particular problem even when the angle "ϕ" is not defined for the center core C4, and the incident angle "α" of the light beam emitted from the center core C4 can be appropriately calculated through use of the expression (4).

It can be understood from above that the incident angle "α" to the optical filter 40 of a light beam emitted from each of the cores C1 to C7 can be calculated based on the rotation angle "η" of the optical filter 40, the light beam angle "θ" of this light beam, and the angle "ϕ" of the core corresponding to this light beam. When the incident angle "α" is calculated, the wavelength shift amount Δλ can be calculated through use of the expression (1). The inventors of the present application have applied MCFs having various numbers of cores and various core arrangements to the optical filter device 10 so as to discuss the circumferential orientation capable of reducing the maximum value of the variation in the transmission spectra through use of the expression (4) and the expression (1).

Figure 8A:
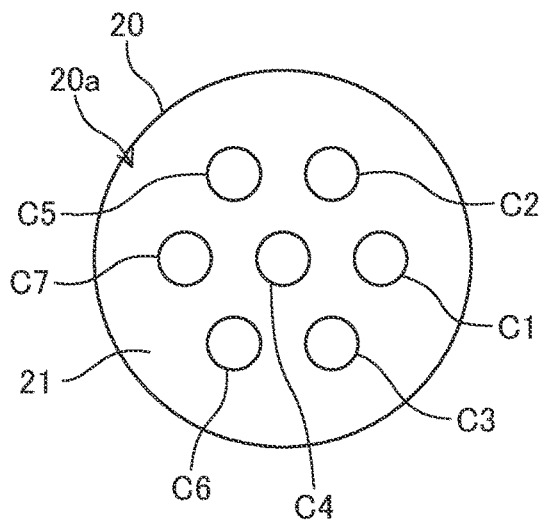
FIG. 8A is a view for illustrating the number of cores and a core arrangement of a multi-core optical fiber.
Figure 8B:
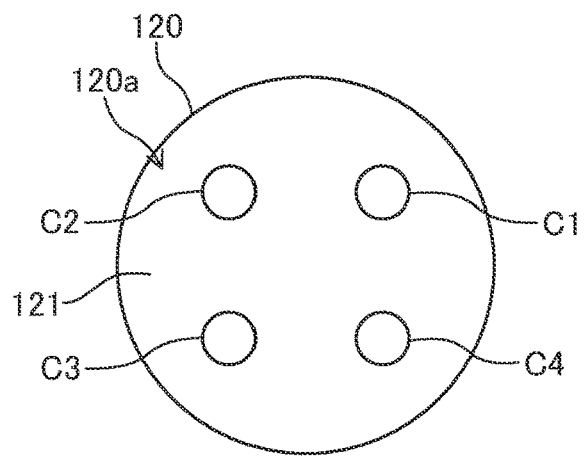
FIG. 8B is a view for illustrating the number of cores and a core arrangement of another multi-core optical fiber.
Figure 8C:
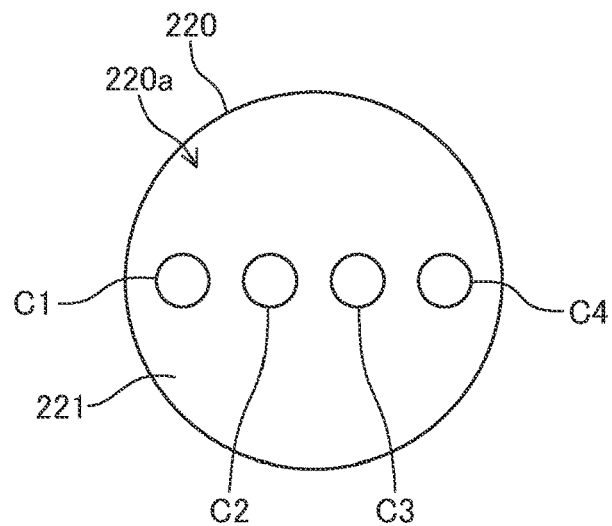
FIG. 8C is a view for illustrating the number of cores and a core arrangement of further another multi-core optical fiber.

FIG. 8A to FIG. 8C are views for illustrating the end faces of the MCFs used for the discussion. The MCF of FIG. 8A is the MCF 20. The configuration of the MCF 20 has been described with reference to FIG. 2, and hence a detailed description thereof is omitted. The light beam angle "6" of the light beam emitted from the center core C4 is 0°. The light beam angles "θ" of the light beams emitted from the surrounding cores C1 to C3 and C5 to C7 are equal to each other owing to the symmetric property with respect to the light beam emitted from the center core C4, and are each 0.87° (see FIG. 1). Further, the rotation angle "η" is set to 2.9°. The same holds true also in the examples of FIG. 8B and FIG. 8C. Each of the surrounding cores C1 to C3 and C5 to C7 corresponds to an example of an "outermost peripheral core."

The MCF of FIG. 8B is an MCF 120 in which only the number of cores and the core arrangement are different from those of the MCF 20. The MCF 120 includes four cores C1 to C4 each serving as the first core, and a common cladding 121 surrounding those cores C1 to C4. The cores C1 to C4 are positioned at vertices of a square having a center of an end face 120a as a center. That is, each of the cores C1 to C4 is the "surrounding core." The core pitch is 50 μm. The light beam angles "6" of the light beams emitted from the cores C1 to C4 are equal to each other owing to the symmetric property with respect to the center axis of the MCF 120, and are each 0.81°. Each of the cores C1 to C4 corresponds to an example of the "outermost peripheral core."

The MCF of FIG. 8C is an MCF 220 in which only the core arrangement is different from that of the MCF 120. The MCF 220 includes four cores C1 to C4 each serving as the first core, and a common cladding 221 surrounding those cores C1 to C4. The core C1 to the core C4 are arranged on a straight line so as to have two-fold symmetry with respect to a center of an end face 220a serving as a center. That is, each of the cores C1 to C4 is the "surrounding core." The core pitch is 50 µm. The light beam angles "θ" of the light beams emitted from the cores C1 and C4 are equal to each other owing to the symmetric property with respect to the center axis of the MCF 220, and are each 1.7°. The light beam angles "θ" of the light beams emitted from the cores C2 and C3 are equal to each other owing to the symmetric property with respect to the center axis of the MCF 220, and are each 0.57°.

Figure 9A:
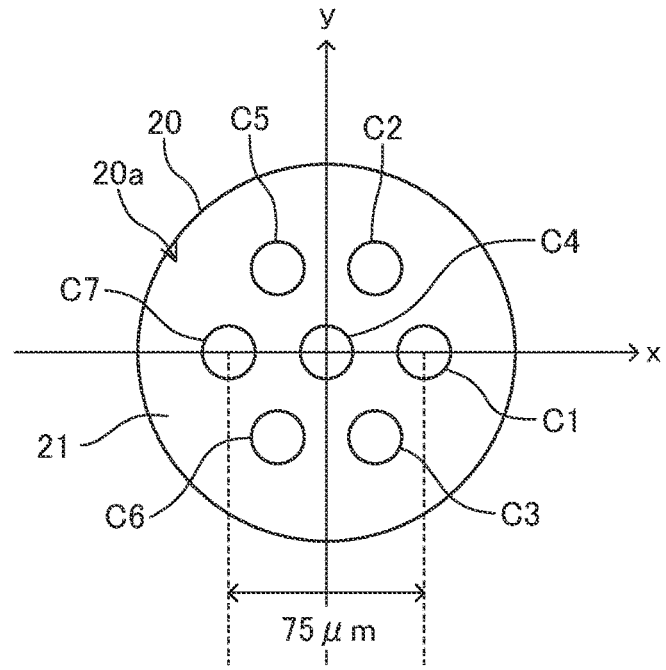
FIG. 9A is a view for illustrating the end face at the time when the multi-core optical fiber of FIG. 8A is set to an orthogonal type.

FIG. 9A is a view for illustrating the end face 20a at the time when the circumferential orientation of the MCF 20 (see FIG. 8A) is set so that a straight line passing through the cores C1, C4, and C7 is orthogonal to the y-axis serving as a reference axis (that is, an axis passing through the axis A1 and being parallel to the rotation axis r1). In the following, such an orientation is also referred to as "orthogonal type." Here, a core that is most separated away from the y-axis in the −x-axis direction is defined as a "first separated core," and a core that is most separated away from the y-axis in the +x-axis direction is defined as a "second separated core." In this case, in this example, the first separated core is the core C7, and the second separated core is the core C1. Further, a sum of "the distance from the y-axis to the first separated core" and "the distance from the y-axis to the second separated core" is defined as a "separation distance." In this case, in this example, the separation distance is 75 m. The −x-axis direction corresponds to an example of a "first orthogonal direction" directed toward one side with respect to the y-axis along the x-axis serving as an orthogonal axis, and the +x-axis direction corresponds to an example of a "second orthogonal direction" directed toward another side with respect to the y-axis along the x-axis. In this embodiment, the rotation axis r1 is also an axis passing through the axis A1, and hence the rotation axis r1 may be used as the reference axis.

Figure 9B:
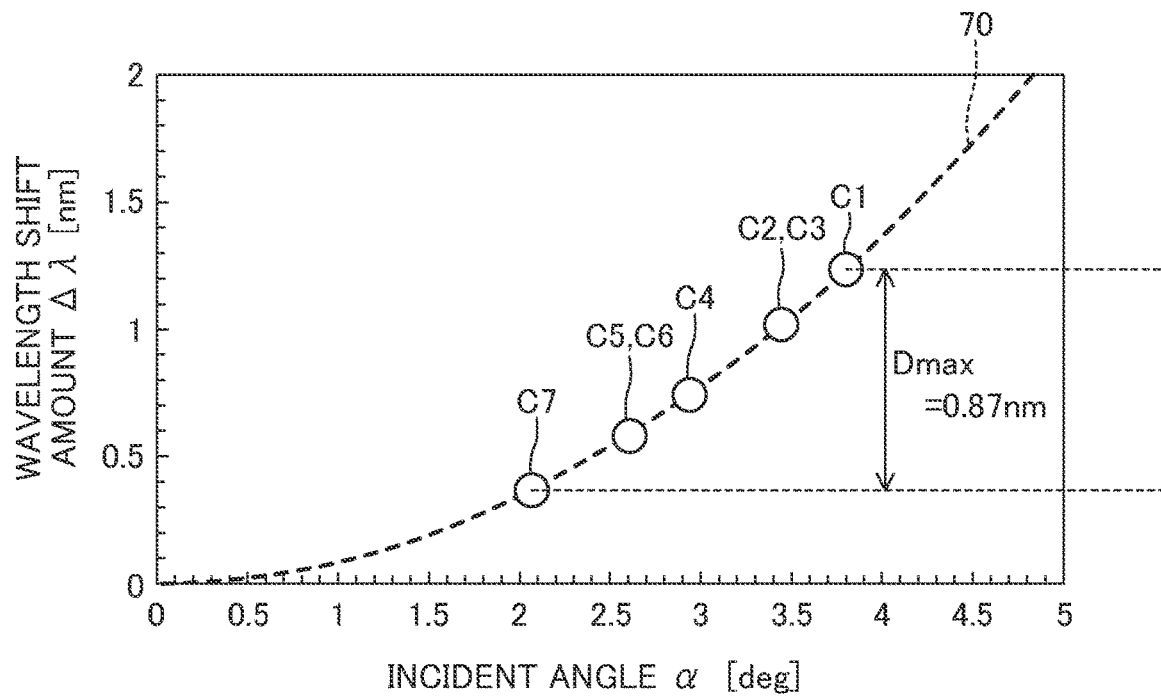
FIG. 9B is a graph for defining the relationship between the incident angle "$\alpha$" and the wavelength shift amount $\Delta\lambda$ of a light beam emitted from each core of the multi-core optical fiber of FIG. 9A.

FIG. 9B is a graph for defining the relationship between the incident angle "α" and the wavelength shift amount Δλ of the light beam emitted from each of the cores C1 to C7 at the time when the MCF 20 is set to the orthogonal type. The incident angle "α" can be calculated from the expression (4), and the wavelength shift amount Δλ can be calculated from the expression (1). For example, the wavelength shift amount Δλ of the light beam emitted from the core C7 can be calculated by first calculating the incident angle "α" by substituting η=2.9°, θ=0.87°, and φ=180° into the expression (4), and then substituting this incident angle "α" and the above-mentioned other physical quantities into the expression (1). A broken line 70 of the graph indicates the analytical expression (1).

With reference to the graph of FIG. 9B, the incident angle "α" of the light beam emitted from the first separated core C7 is minimum, and the incident angle "α" of the light beam emitted from the second separated core C1 is maximum. Accordingly, the wavelength shift amount Δλ of the light beam emitted from the first separated core C7 is minimum, and the wavelength shift amount Δλ of the light beam emitted from the second separated core C1 is maximum. The maximum value of the variation in the transmission spectra is equal to a difference between a minimum value Δλ min and a maximum value Δλ max of the wavelength shift amount Δλ. In the following, this difference (Δλ max-Δλ min) is referred to as "maximum value Dmax of variation in transmission spectra," or simply "maximum value Dmax of variation" or "Dmax." The maximum value Dmax of the variation in the transmission spectra at the time when the MCF 20 was set to the orthogonal type was 0.87 nm. The incident angle "α" of the light beam emitted from the center core C4 is equal to the rotation angle "η" (see FIG. 3 and FIG. 4). Accordingly, with reference to the graph of FIG. 9B, the incident angle "α" of the light beam emitted from the center core C4 is 2.9°. The same holds true also in FIG. 10B.

Figure 10A:
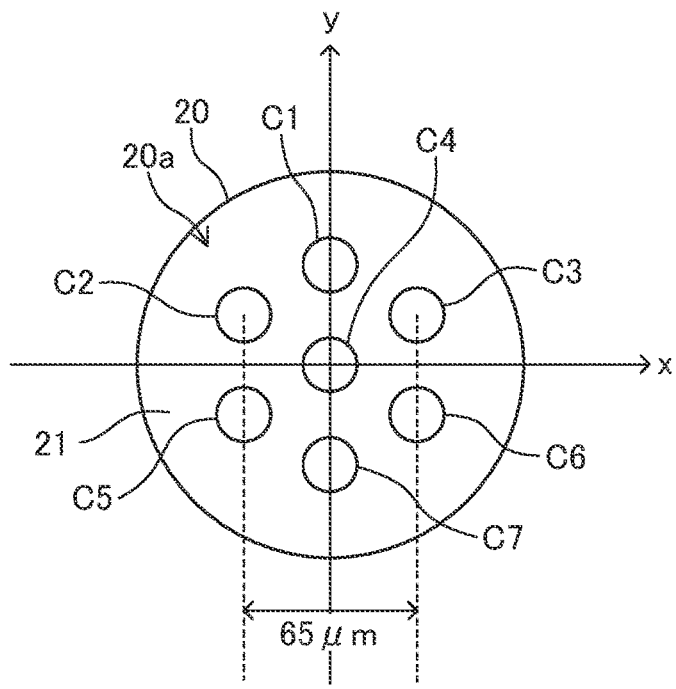
FIG. 10A is a view for illustrating the end face at the time when the multi-core optical fiber of FIG. 8A is set to a parallel type.

FIG. 10A is a view for illustrating the end face 20a at the time when the circumferential orientation of the MCF 20 is set so that the straight line passing through the cores C1, C4, and C7 is parallel to the y-axis. In the following, such an orientation is also referred to as "parallel type." In this example, the first separated cores are the cores C2 and C5, and the second separated cores are the cores C3 and C6. Further, the separation distance is 65 µm.

Figure 10B:
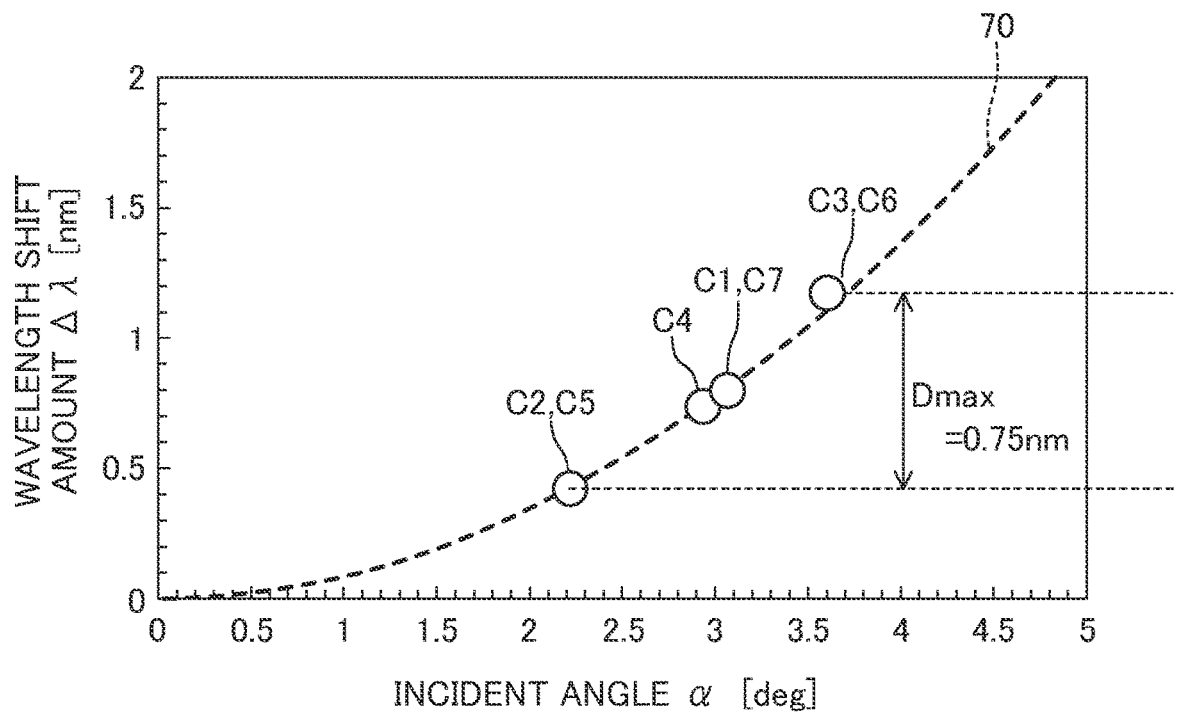
FIG. 10B is a graph for defining the relationship between the incident angle "$\alpha$" and the wavelength shift amount $\Delta\lambda$ of a light beam emitted from each core of the multi-core optical fiber of FIG. 10A.

FIG. 10B is a graph for defining the relationship between the incident angle "α" and the wavelength shift amount Δλ of the light beam emitted from each of the cores C1 to C7 at the time when the MCF 20 is set to the parallel type. With reference to the graph of FIG. 10B, the incident angles "α" of the light beams emitted from the first separated cores C2 and C5 are minimum, and the incident angles "α" of the light beams emitted from the second separated cores C3 and C6 are maximum. Accordingly, the wavelength shift amounts DA of the light beams emitted from the first separated cores C2 and C5 are minimum, and the wavelength shift amounts Δλ of the light beams emitted from the second separated cores C3 and C6 are maximum. The maximum value Dmax of the variation in the transmission spectra at the time when the MCF 20 was set to the parallel type was 0.75 nm.

With reference to FIG. 9A to FIG. 10B, the separation distance (65 µm) at the time of the parallel type is shorter than the separation distance (75 µm) at the time of the orthogonal type. Further, the variation in the incident angles "α" at the time of the parallel type is smaller than the variation in the incident angles "α" at the time of the orthogonal type, and hence the variation in the wavelength shift amount Δλ (that is, Dmax) is smaller at the time of the parallel type.

It is understood from above that the position of the core in the x-axis direction and the incident angle "α" have correlation therebetween. Specifically, it is understood that, as the separation distance becomes shorter, the variation in the incident angles "α" becomes smaller, with the result that the variation (Amax-Amin) in the wavelength shift amount Δλ can be reduced, that is, the maximum value Dmax of the variation in the transmission spectra can be reduced. The orthogonal type corresponds to the circumferential orientation of the MCF 20 at the time when the separation distance is maximized (that is, Dmax is maximized), and the parallel type corresponds to the circumferential orientation of the MCF 20 at the time when the separation distance is minimized (that is, Dmax is minimized). The maximum value Dmax (0.75 nm) at the time of the parallel type is smaller by about 13% as compared to the maximum value Dmax (0.87 nm) at the time of the orthogonal type. This result means that, when the circumferential orientation of the MCF 20 is set to the parallel type, Dmax can be reduced by about 13% at maximum.

Further, with reference to FIG. 9A and FIG. 10A, the surrounding cores C1 to C3 and C5 to C7 have line symmetry with respect to the y-axis no matter which of the orthogonal type and the parallel type is set for the MCF 20. However, when the MCF 20 is set to the orthogonal type, two surrounding cores (core C1 and C7) among the six surrounding cores (cores C1 to C3 and C5 to C7) are positioned on the x-axis, while, when the MCF 20 is set to the parallel type, no surrounding core is positioned on the x-axis. In view of the above, the circumferential orientation of the MCF 20 at the time when the separation distance is minimized (that is, Dmax is minimized) can also be defined as follows. That is, in an MCF (MCF 20) having "a core arrangement in which surrounding cores are positioned at vertices of a regular hexagon having a center of an end face of the MCF as a center," when the MCF is set to, of two types (orthogonal type and parallel type) in each of which the surrounding cores have line symmetry with respect to the y-axis, a type (parallel type) in which the surrounding cores are prevented from being positioned on the x-axis, the separation distance can be minimized.

Figure 11A:
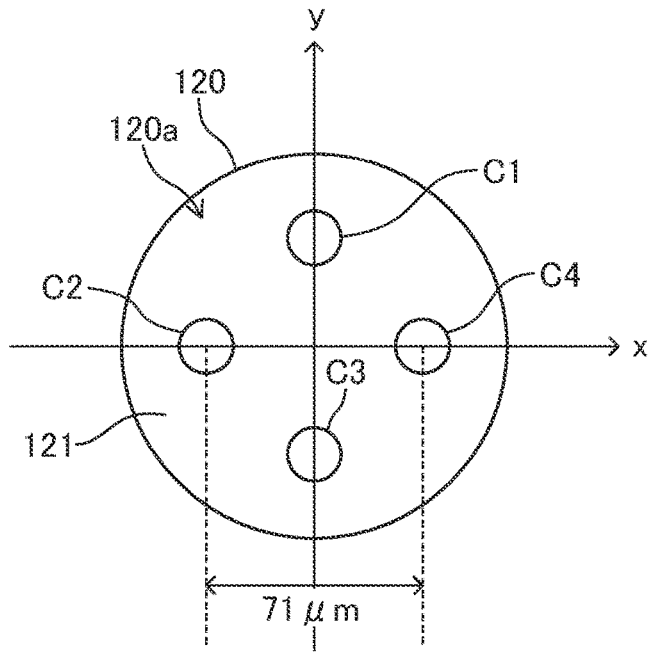
FIG. 11A is a view for illustrating the end face at the time when the multi-core optical fiber of FIG. 8B is set to a diagonal line type.

FIG. 11A is a view for illustrating the end face 120a at the time when the circumferential orientation of the MCF 120 (see FIG. 8B) is set so that the straight line passing through the core C2 and the core C4 is orthogonal to the y-axis. In the following, such an orientation is also referred to as "diagonal line type." In this example, the first separated core is the core C2, and the second separated core is the core C4. Further, the separation distance is 71 μm.

Figure 11B:
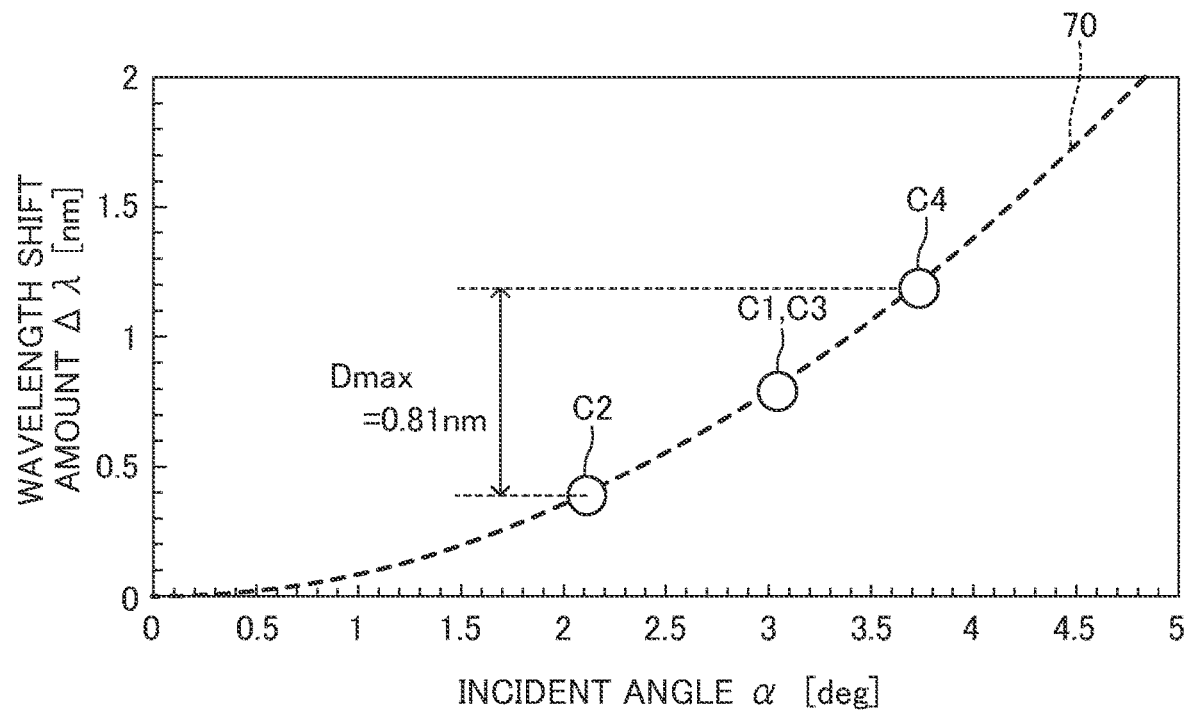
FIG. 11B is a graph for defining the relationship between the incident angle "α" and the wavelength shift amount Δλ of a light beam emitted from each core of the multi-core optical fiber of FIG. 11A.

FIG. 11B is a graph for defining the relationship between the incident angle "α" and the wavelength shift amount Δλ of the light beam emitted from each of the cores C1 to C4 at the time when the MCF 120 is set to the diagonal line type. With reference to the graph of FIG. 11B, the incident angle "α" and the wavelength shift amount Δλ of the light beam emitted from the first separated core C2 are minimum, and the incident angle "α" and the wavelength shift amount Δλ of the light beam emitted from the second separated core C4 are maximum. The maximum value Dmax of the variation in the transmission spectra at the time when the MCF 120 was set to the diagonal line type was 0.81 nm.

Figure 12A:
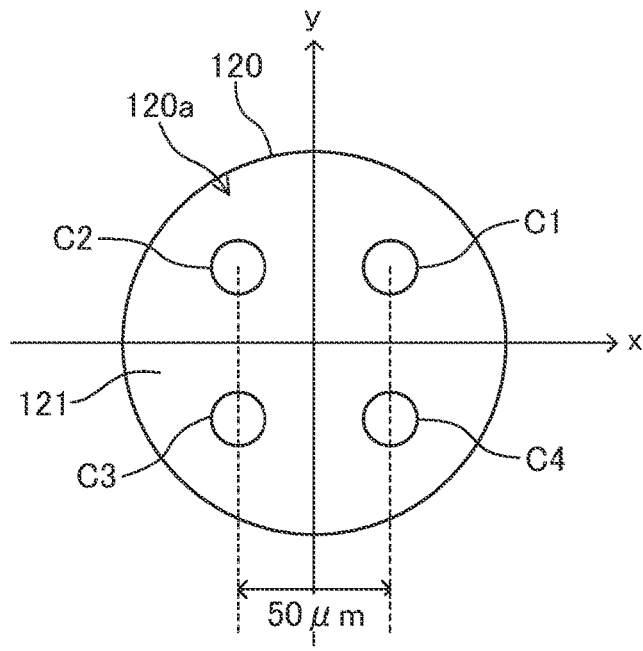
FIG. 12A is a view for illustrating the end face at the time when the multi-core optical fiber of FIG. 8B is set to the parallel type.

FIG. 12A is a view for illustrating the end face 120a at the time when the circumferential orientation of the MCF 120 is set so that the straight line passing through the cores C2 and C3 (or the cores C1 and C4) is parallel to the y-axis. In the following, such an orientation is also referred to as "parallel type." In this example, the first separated cores are the cores C2 and C3, and the second separated cores are the cores C1 and C4. Further, the separation distance is 50 μm.

Figure 12B:
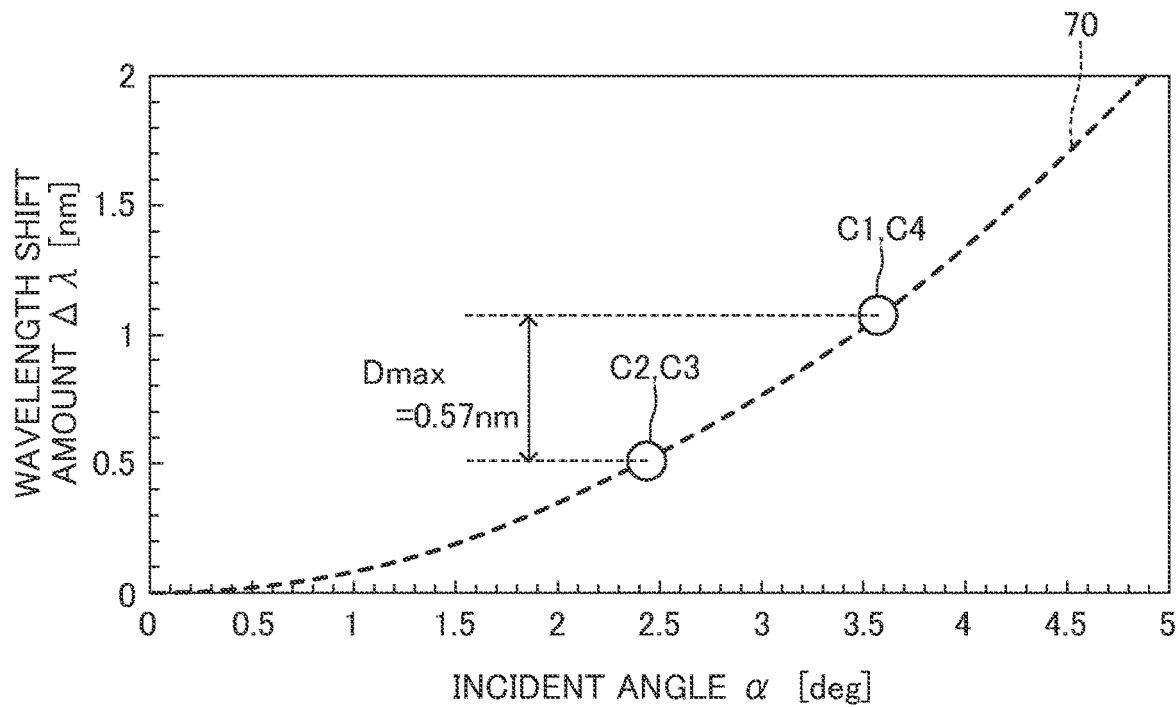
FIG. 12B is a graph for defining the relationship between the incident angle "α" and the wavelength shift amount Δλ of a light beam emitted from each core of the multi-core optical fiber of FIG. 12A.

FIG. 12B is a graph for defining the relationship between the incident angle "α" and the wavelength shift amount Δλ of the light beam emitted from each of the cores C1 to C4 at the time when the MCF 120 is set to the parallel type. With reference to the graph of FIG. 12B, the incident angles "α" and the wavelength shift amounts Δλ of the light beams emitted from the first separated cores C2 and C3 are minimum, and the incident angles "α" and the wavelength shift amounts Δλ of the light beams emitted from the second separated cores C1 and C4 are maximum. The maximum value Dmax of the variation in the transmission spectra at the time when the MCF 120 was set to the parallel type was 0.57 nm.

With reference to FIG. 11A to FIG. 12B, the separation distance (50 μm) at the time of the parallel type is shorter than the separation distance (71 μm) at the time of the diagonal line type. Further, the variation in the incident angles "α" at the time of the parallel type is smaller than the variation in the incident angles "α" at the time of the diagonal line type, and hence the variation in the wavelength shift amount Δλ (that is, Dmax) is smaller at the time of the parallel type.

It is understood from above that, similarly to the case of the MCF 20, as the separation distance becomes shorter, the variation in the incident angles "α" becomes smaller, with the result that the maximum value Dmax of the variation in the transmission spectra can be reduced. The diagonal line type corresponds to the circumferential orientation of the MCF 120 at the time when the separation distance is maximized, and the parallel type corresponds to the circumferential orientation of the MCF 120 at the time when the separation distance is minimized. The maximum value Dmax (0.53 nm) at the time of the parallel type is smaller by about 29% as compared to the maximum value Dmax (0.81 nm) at the time of the diagonal line type. This result means that, when the circumferential orientation of the MCF 120 is set to the parallel type, Dmax can be reduced by about 29% at maximum.

Further, with reference to FIG. 11A and FIG. 12A, the surrounding cores C1 to C4 have line symmetry with respect to the y-axis no matter which of the diagonal line type and the parallel type is set for the MCF 120. However, when the MCF 120 is set to the diagonal line type, two surrounding cores (core C2 and C4) among the four surrounding cores (cores C1 to C4) are positioned on the x-axis, while, when the MCF 120 is set to the parallel type, no surrounding core is positioned on the x-axis. In view of the above, similarly to the case of the MCF 20, the circumferential orientation of the MCF 120 at the time when the separation distance is minimized can also be defined as follows. That is, in an MCF (MCF 120) having "a core arrangement in which surrounding cores are positioned at vertices of a square having a center of an end face of the MCF as a center," when the MCF is set to, of two types (diagonal line type and parallel type) in each of which the surrounding cores have line symmetry with respect to the y-axis, a type (parallel type) in which the surrounding cores are prevented from being positioned on the x-axis, the separation distance can be minimized.

Figure 13A:
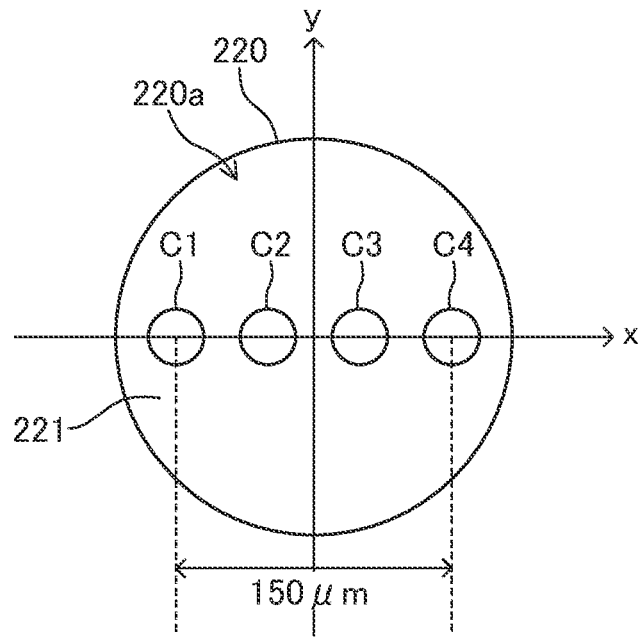
FIG. 13A is a view for illustrating the end face at the time when the multi-core optical fiber of FIG. 8C is set to the orthogonal type.

FIG. 13A is a view for illustrating the end face 220a at the time when the circumferential orientation of the MCF 220 (see FIG. 8C) is set so that the straight line passing through the cores C1 to C4 is orthogonal to the y-axis. In the following, such an orientation is also referred to as "orthogonal type." In this example, the first separated core is the core C1, and the second separated core is the core C4. Further, the separation distance is 150 μm.

Figure 13B:
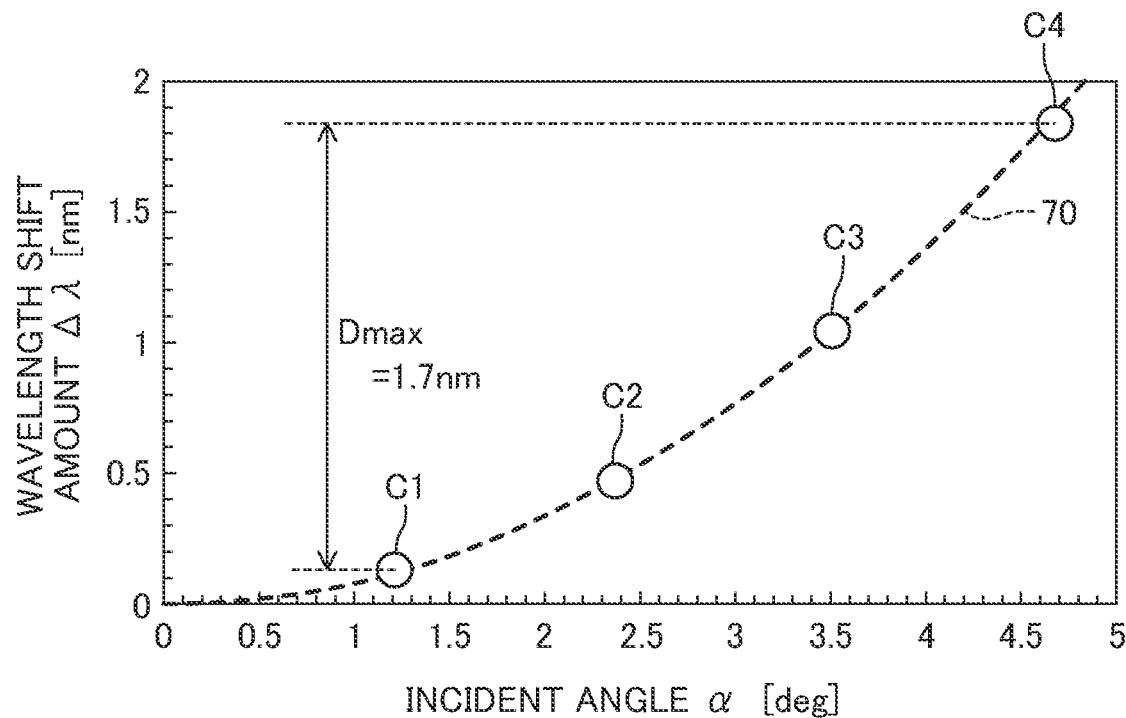
FIG. 13B is a graph for defining the relationship between the incident angle "α" and the wavelength shift amount Δλ of a light beam emitted from each core of the multi-core optical fiber of FIG. 13A.

FIG. 13B is a graph for defining the relationship between the incident angle "α" and the wavelength shift amount Δλ of the light beam emitted from each of the cores C1 to C4 at the time when the MCF 220 is set to the orthogonal type. With reference to the graph of FIG. 13B, the incident angle "α" and the wavelength shift amount Δλ of the light beam emitted from the first separated core C1 are minimum, and the incident angle "α" and the wavelength shift amount Δλ of the light beam emitted from the second separated core C4 are maximum. The maximum value Dmax of the variation in the transmission spectra at the time when the MCF 220 was set to the orthogonal type was 1.7 nm.

Figure 14A:
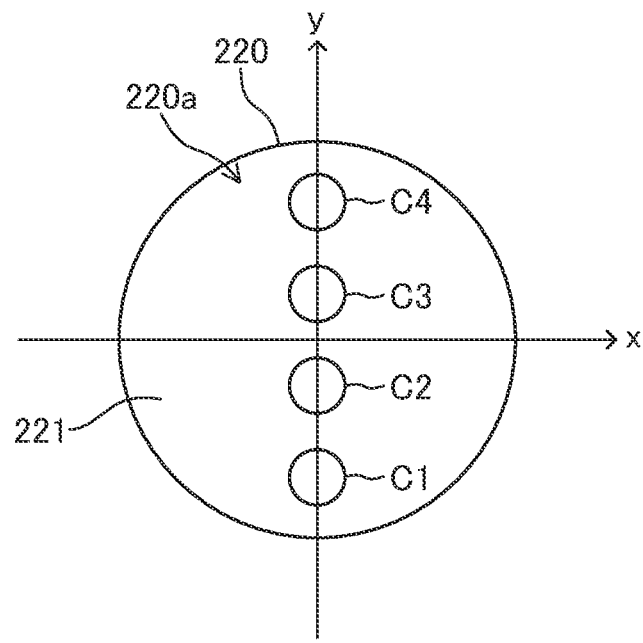
FIG. 14A is a view for illustrating the end face at the time when the multi-core optical fiber of FIG. 8C is set to the parallel type.

FIG. 14A is a view for illustrating the end face 220a at the time when the circumferential orientation of the MCF 220 is set so that the straight line passing through the cores C1 to C4 is parallel to the y-axis. In the following, such an orientation is also referred to as "parallel type." In the case of the parallel type, the cores C1 to C4 are arranged along the y-axis, and hence the cores C1 to C4 are each the first separated core and also the second separated core. Accordingly, the separation distance is 0 µm.

Figure 14B:
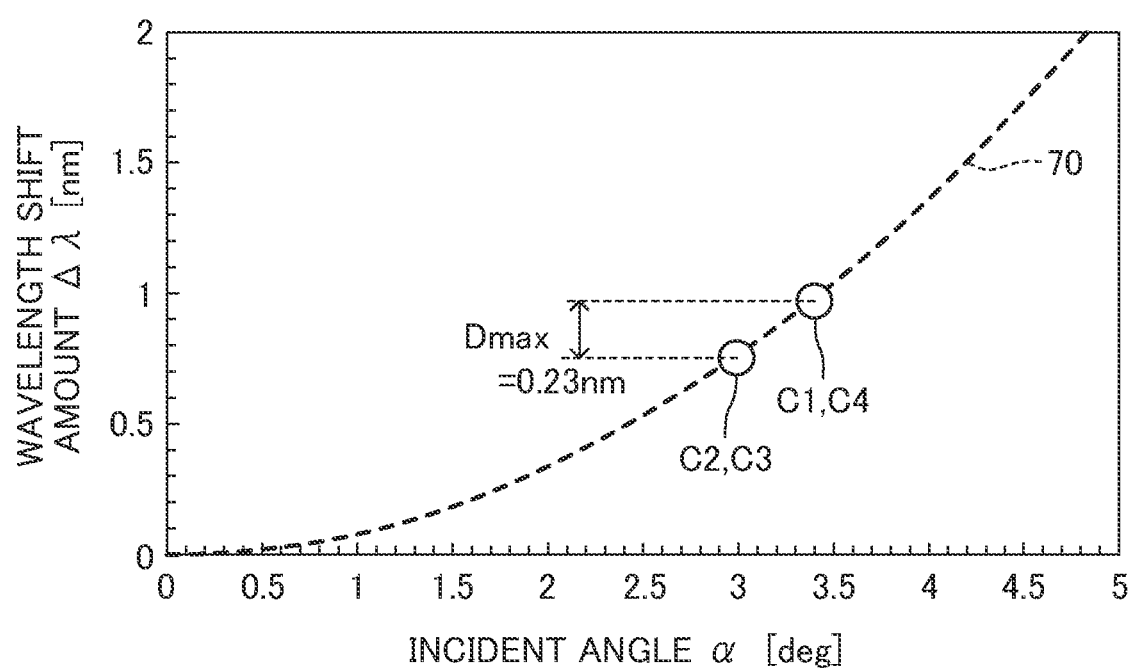
FIG. 14B is a graph for defining the relationship between the incident angle "α" and the wavelength shift amount Δλ of a light beam emitted from each core of the multi-core optical fiber of FIG. 14A.

FIG. 14B is a graph for defining the relationship between the incident angle "α" and the wavelength shift amount Δλ of the light beam emitted from each of the cores C1 to C4 at the time when the MCF 220 is set to the parallel type. With reference to the graph of FIG. 14B, the incident angles "α" and the wavelength shift amounts Δλ of the light beams emitted from the cores C2 and C3 (that is, cores closer to the axis A1 (z-axis)) are minimum, and the incident angles "α" and the wavelength shift amounts Δλ of the light beams emitted from the cores C1 and C4 (that is, cores farther from the axis A1) are maximum. The maximum value Dmax of the variation in the transmission spectra at the time when the MCF 220 was set to the parallel type was 0.23 nm.

With reference to FIG. 13A to FIG. 14B, the separation distance (0 µm) at the time of the parallel type is shorter than the separation distance (150 µm) at the time of the orthogonal type. Further, the variation in the incident angles "α" at the time of the parallel type is smaller than the variation in the incident angles "α" at the time of the orthogonal type, and hence the variation in the wavelength shift amount Δλ (that is, Dmax) is smaller at the time of the parallel type.

It is understood from above that, similarly to the cases of the MCF 20 and the MCF 120, as the separation distance becomes shorter, the variation in the incident angles "α" becomes smaller, with the result that the maximum value Dmax of the variation in the transmission spectra can be reduced. The orthogonal type corresponds to the circumferential orientation of the MCF 220 at the time when the separation distance is maximized, and the parallel type corresponds to the circumferential orientation of the MCF 220 at the time when the separation distance is minimized. The maximum value Dmax (0.23 nm) at the time of the parallel type is smaller by about 87% as compared to the maximum value Dmax (1.7 nm) at the time of the orthogonal type. This result means that, when the circumferential orientation of the MCF 220 is set to the parallel type, Dmax can be reduced by about 87% at maximum.

Further, with reference to FIG. 13A and FIG. 14A, the surrounding cores C1 to C4 have line symmetry with respect to the y-axis no matter which of the orthogonal type and the parallel type is set for the MCF 220. However, when the MCF 220 is set to the orthogonal type, all of the four surrounding cores (cores C1 to C4) are positioned on the x-axis, while, when the MCF 220 is set to the parallel type, no surrounding core is positioned on the x-axis. In view of the above, similarly to the cases of the MCFs 20 and 120, the circumferential orientation of the MCF 220 at the time when the separation distance is minimized can also be defined as follows. That is, in an MCF (MCF 220) having "a core arrangement in which surrounding cores are arranged along a straight line passing through a center of an end face of the MCF," when the MCF is set to, of two types (orthogonal type and parallel type) in each of which the surrounding cores have line symmetry with respect to the y-axis, a type (parallel type) in which the surrounding cores are prevented from being positioned on the x-axis, the separation distance can be minimized.

With reference to the above-mentioned discussion results, when the MCF 20, 120, or 220 is applied to the optical filter device 10, the circumferential orientation of each of those MCFs is desired to be set to the parallel type. Thus, the separation distance of each of the MCFs 20, 120, and 220 is minimized, and hence the variation in the incident angles "α" to the optical filter 40 of the light beam emitted from each core can be kept to the minimum. Accordingly, the maximum value Dmax of the variation in the transmission spectra of the light beam emitted from each core can be kept to the minimum, and occurrence of the variation in the transmission loss of those light beams in any certain wavelength can be suppressed at maximum. As a result, the optical signal can be appropriately transmitted while the reflected return light is reduced.

When the MCF has "the core arrangement in which the surrounding cores are positioned at the vertices of the regular polygon having the center of the end face of the MCF as the center," the MCF may include one or a plurality of other surrounding cores as inner peripheral cores on a radially inner side with respect to those surrounding cores. The inner peripheral cores are not required to have a symmetric relationship, and may be arranged in any way. The reason therefor is because, in order to keep the maximum value Dmax of the variation to the minimum, it is only required to minimize the separation distance, and the separation distance is a value which is determined regardless of (without being affected by) the core arrangement of the inner peripheral cores.

The number of cores and the core arrangement of the MCF are not limited to those of the examples given in FIG. 8A to FIG. 8C. Further, the core arrangement of the MCF is not required to have the symmetric property with respect to the center of the end face of the MCF. In other words, the first separated core and the second separated core may be shifted in the y-axis direction from each other, or the distance from the y-axis to the first separated core may be different from the distance from the y-axis to the second separated core. Also in such cases, when the circumferential orientation of the MCF is set so that the separation distance is minimized, the variation in the incident angles "α" can be kept to the minimum, and hence the above-mentioned effect can be provided.

Moreover, the optical filter 40 may be rotated so that the rotation angle "n" has a negative value. Also in this case, when the circumferential orientation of the MCF is set so that the separation distance is minimized, the above-mentioned effect can be provided.

Second Embodiment

Figure 15:
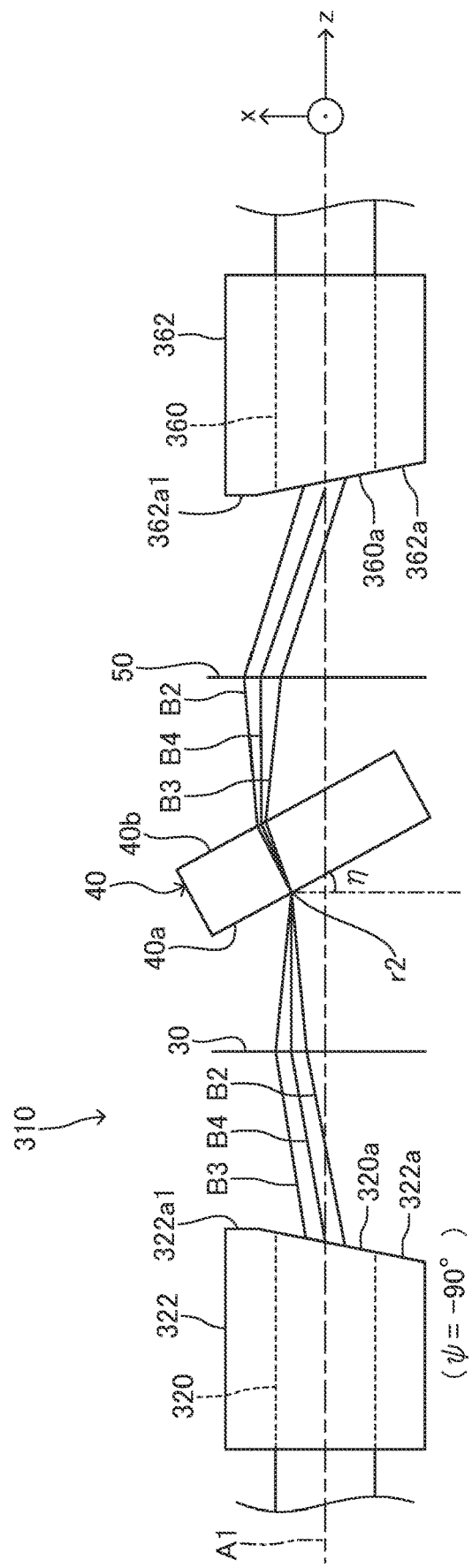
FIG. 15 is a plan view for illustrating an optical filter device according to a second embodiment of the present invention.

FIG. 15 is a plan view for illustrating an example of an optical filter device 310 according to a second embodiment of the present invention. In this embodiment, like members as those of the first embodiment are denoted by like reference symbols, and a detailed description of configurations similar to those in the first embodiment is omitted. As illustrated in FIG. 15, the optical filter device 310 is different from the optical filter device 10 in that the optical filter device 310 includes an MCF 320 and a ferrule 322 in place of the MCF 20 and the ferrule 22, and further includes an MCF 360 and a ferrule 362 in place of the MCF 60 and the ferrule 62. Further, the position of the second lens 50 is different from the position of the second lens 50 in the optical filter device 10.

As illustrated in FIG. 15, an end face 320a of the MCF 320 is obliquely polished (subjected to oblique polishing) so as to be inclined by a predetermined polishing angle (for example, 8°) in a predetermined inclination direction with respect to the xy plane. Thus, the reflected return light at the end face 320a is reduced. The end face 320a has an elliptical shape as viewed from a direction perpendicular to the end face 320a. In the following, a direction obtained when a direction directed along a major axis (one example of an oblique polishing reference axis) of the end face 320a from a distal end which is more separated away from the optical filter 40 toward a proximal end which is more proximal to the optical filter 40 is viewed along the center axis of the end face 320a is defined as an "oblique polishing direction."

Figure 16:
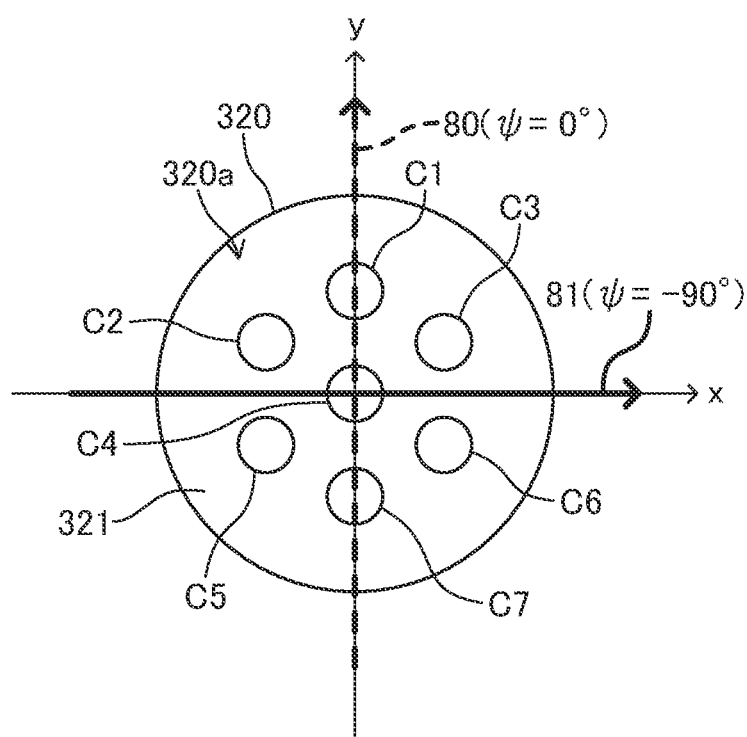
FIG. 16 is a view to be used for describing an oblique polishing direction of a multi-core optical fiber functioning as an emission member.

FIG. 16 is a view for illustrating the end face 320a. A solid-line arrow 81 of FIG. 16 indicates the oblique polishing direction of the end face 320a, and a broken-line arrow 80 indicates a reference direction serving as a reference for calculating an oblique polishing angle to be described later. As illustrated in FIG. 16, the reference direction 80 extends along the +y-axis direction. In the following, an angle formed counterclockwise from the reference direction 80 by any certain oblique polishing direction is defined as "an oblique polishing rotation angle ψ having a positive value." In this example, the oblique polishing direction 81 forms an angle of 270° counterclockwise from the reference direction 80, and hence the oblique polishing rotation angle ψ of the oblique polishing direction 81 is 270° (in other words, −90°).

As illustrated in FIG. 15, an end portion of the MCF 320 in the +z-axis direction is inserted into and held by the ferrule 322 having a cylindrical shape. The end face 320a of the MCF 320 is collectively obliquely polished together with an end face 322a of the ferrule 322. However, an end portion 322a1 of the end face 322a of the ferrule 322 in the oblique polishing direction 81 is not obliquely polished, and is in parallel to the xy plane. The end portion 322a1 is a so-called polishing allowance.

The MCF 320 includes seven cores C1 to C7, and a common cladding 321 surrounding those cores C1 to C7. The MCF 320 has a core arrangement similar to that of the MCF 20. Further, the circumferential orientation of the MCF 320 is set to have the parallel type (that is, the orientation in which the separation distance is minimized).

Light beams which have been propagated through the respective cores C1 to C7 of the MCF 320 are emitted from the end face 320a toward the first lens 30. In FIG. 15, only principal rays B3, B4, and B2 of the light beams emitted from the respective cores C3, C4, and C2 (see FIG. 16) are illustrated. The principal rays B3, B4, and B2 progress while being inclined to the oblique polishing direction 81 side (in this example, the +x-axis direction side), and hence the principal rays B3, B4, and B2 are inclined with respect to the axis A1.

The first lens 30 is arranged at a position separated away by a focal length in the +z-axis direction from a center of the center core C4 in the end face 320a. Accordingly, the principal ray B4 exiting from the first lens 30 is parallel to the axis A1. The first lens 30 collimates and collects the light beams emitted from the respective cores C1 to C7.

The optical filter 40 is arranged so that a light collecting point of the emission light exiting from the first lens 30 is positioned on the incident surface 40a. The light beam entering the incident surface 40a passes through the optical filter 40 so as to exit from the exit surface 40b. The optical filter 40 has a rotation axis r2 extending in the y-axis direction at a position at which the light beams are collected on the incident surface 40a. The optical filter 40 is rotated by a rotation angle "η" about the rotation axis r2 from a position at which the optical filter 40 is parallel to the xy plane. Thus, the reflected return light is reduced. The principal ray B4 exiting from the optical filter 40 is parallel to the axis A1.

The second lens 50 is arranged so that its center axis matches the axis A1. The second lens 50 refracts the light beams exiting from the optical filter 40, which have been emitted from the respective cores C1 to C7, so that the principal rays thereof become parallel to each other (see the light beams B3, B4, and B2 of FIG. 15). Further, the second lens 50 converges each of the light beams emitted from the respective cores C1 to C7 (only the principal rays are illustrated in FIG. 15).

The MCF 360 has the same configuration as that of the MCF 320. An end portion of the MCF 360 in the −z-axis direction is inserted into and held by the ferrule 362 having a cylindrical shape. An end face 360a of the MCF 360 is collectively obliquely polished together with an end face 362a of the ferrule 362. Thus, the reflected return light at the end face 360a is reduced. The end face 362a of the ferrule 362 has a polishing allowance at an end portion 362a1 in the oblique polishing direction. The MCF 360 has a relationship of line symmetry with the MCF 320 with respect to the x-axis.

The positional relationship between the second lens 50 and the MCF 360 is determined so that the end face 360a is positioned at a position at which each of the light beams exiting from the second lens, which have been emitted from the respective cores C1 to C7, is converged.

The above corresponds to the description related to the configuration of the optical filter device 310.

The inventors of the present application have applied, to the optical filter device 310, two types of MCFs to be described later in each of which the circumferential orientation is set to the parallel type, and have changed the oblique polishing rotation angle ψ in a range of 0°≤ψ≤360°, to thereby consider the relationship between the oblique polishing rotation angle ψ and the maximum value Dmax of the variation in the transmission spectra.

Figure 17A:
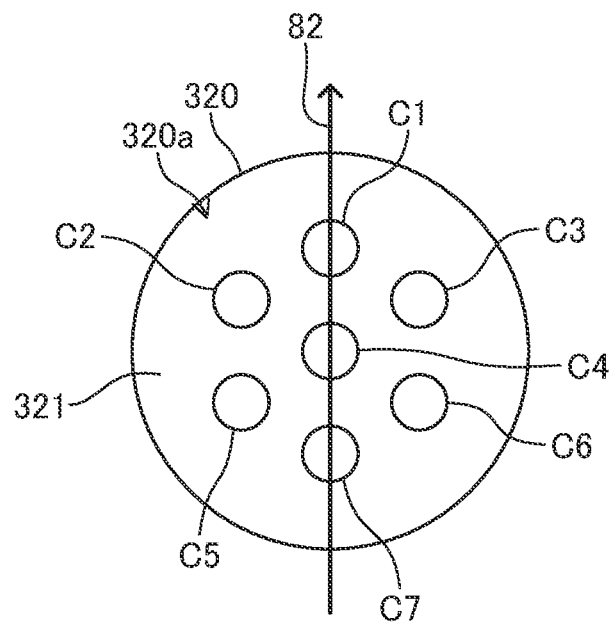
FIG. 17A is a view for illustrating the number of cores and a core arrangement of a multi-core optical fiber whose end face is obliquely polished.
Figure 17B:
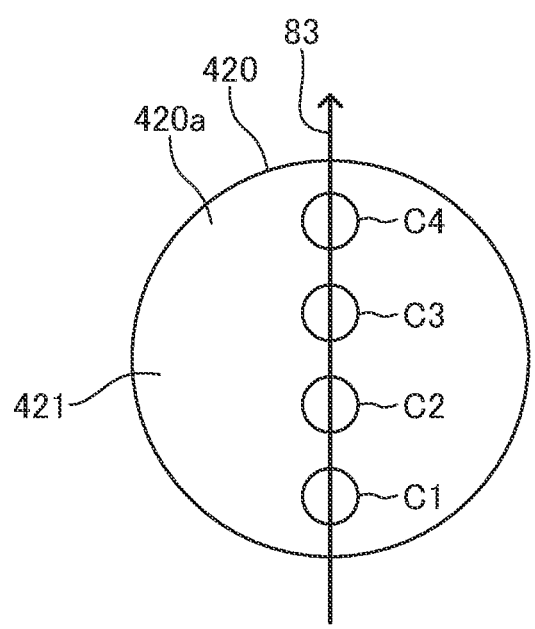
FIG. 17B is a view for illustrating the number of cores and a core arrangement of another multi-core optical fiber whose end face is obliquely polished.

FIG. 17A and FIG. 17B are views for illustrating end faces of the MCFs used for the consideration. The MCF of FIG. 17A is the MCF 320. The configuration of the MCF 320 has been described with reference to FIG. 16, and hence a detailed description thereof is omitted. An oblique polishing direction 82 can be rotated by 360° counterclockwise from the reference direction 80 (not shown). The light beam angle "6" of the light beam emitted from the center core C4 is 0° (see FIG. 15). An average value of the light beam angles "θ" of the light beams emitted from the surrounding cores C1 to C3 and C5 to C7 is 0.87°. In this example, the rotation angle "η" is set in four ways of η=±2.9° and ±1.8°.

The MCF of FIG. 17B is an MCF 420 in which only the number of cores and the core arrangement are different from those of the MCF 320. The MCF 420 includes four cores C1 to C4, and a common cladding 421 surrounding those cores C1 to C4. The MCF 420 has a core arrangement similar to that of the MCF 220. An oblique polishing direction 83 can be rotated by 360° counterclockwise from the reference direction 80 (not shown). Each of the light beam angles "θ" of the light beams emitted from the cores C1 and C4 is 1.7°. Each of the light beam angles "θ" of the light beams emitted from the cores C2 and C3 is 0.57°. In this example, the rotation angle "η" is set to 2.9°.

Figure 18:
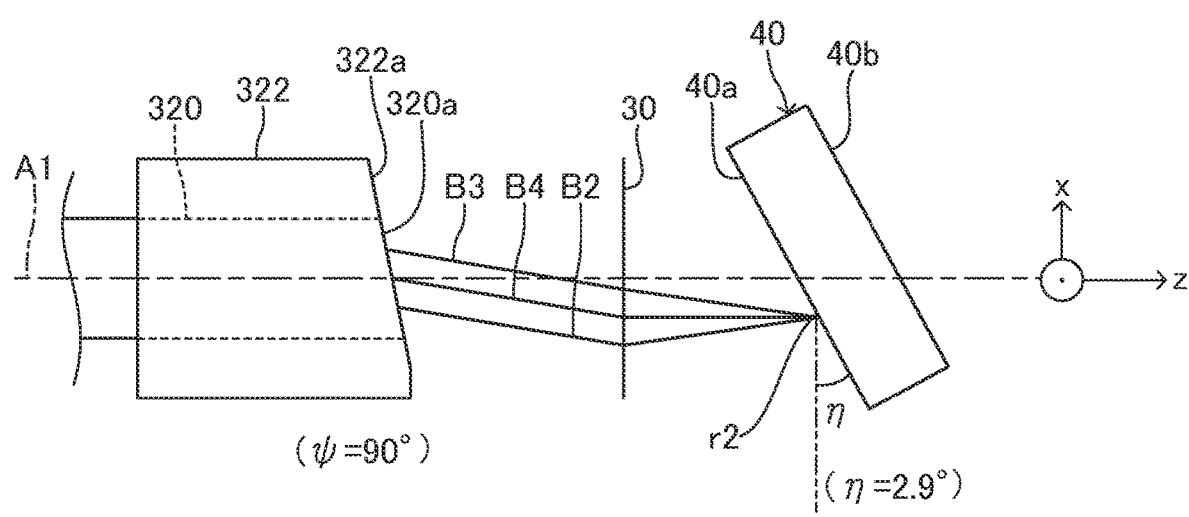
FIG. 18 is a view for illustrating an example of a relative position relationship between the multi-core optical fiber of FIG. 17A and an optical filter in a case of a rotation angle η=2.9°.

FIG. 18 is a view for illustrating an example of a relative position relationship between the optical filter 40 and the obliquely-polished MCF 320 (see FIG. 17A) in the case of the rotation angle η=2.9°. In this example, the end face 320a of the MCF 320 is obliquely polished so that the oblique polishing rotation angle ψ becomes 90°. In FIG. 18, illustration of the light beam passing through the optical filter 40 and exiting from the exit surface 40b is omitted. The same holds true also in FIG. 20.

Figure 19:
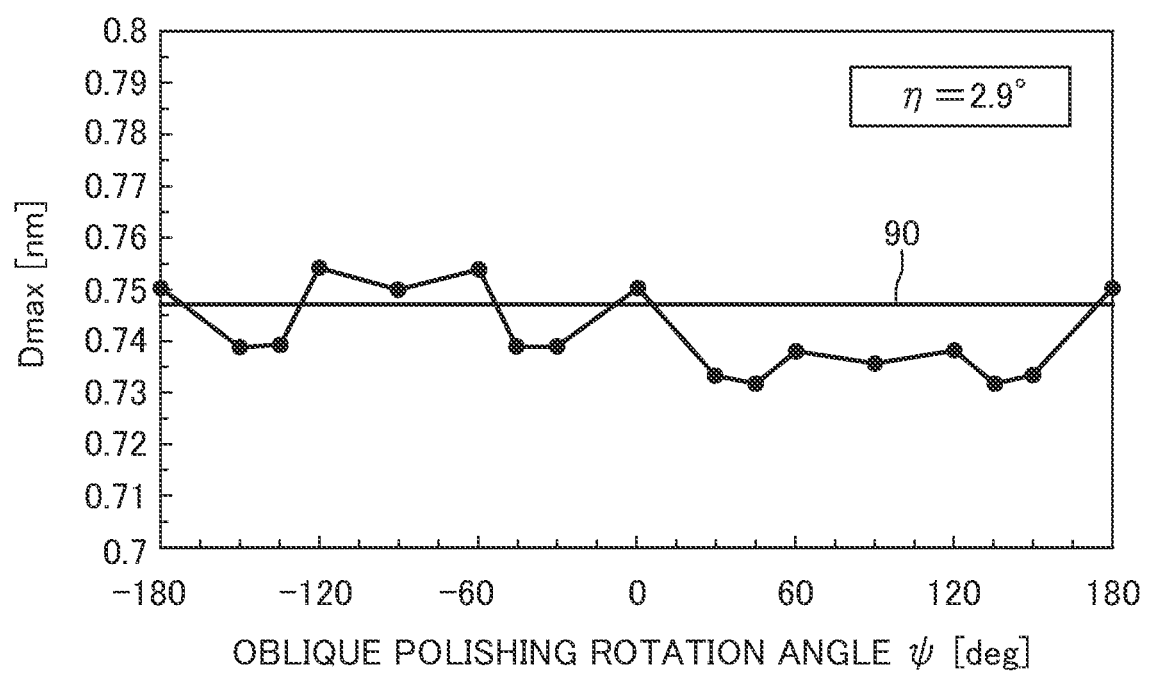
FIG. 19 is a graph for defining a relationship between an oblique polishing rotation angle ψ and a maximum value Dmax of variation of the multi-core optical fiber of FIG. 17A in the case of the rotation angle η=2.9°.

FIG. 19 is a graph for defining the relationship between "the oblique polishing rotation angle ψ" and "the maximum value Dmax of the variation" at the time when the oblique polishing rotation angle ψ of the MCF 320 illustrated in FIG. 18 is changed in the range of −180°≤ψ≤180°. In the graph, a solid line 90 indicates the maximum value Dmax of the variation at the time when an MCF having an end face which is not obliquely polished (that is, the MCF 20 of the parallel type in the first embodiment (see FIG. 10A and FIG. 10B)) is used. In FIG. 10B, Dmax=0.75 nm is shown, but this is because description is given with two significant figures, and the exact numerical value is slightly smaller than 0.75 nm as indicated by the solid line 90. With reference to FIG. 19, in a range of 0°≤ψ≤180°, Dmax of the obliquely-polished MCF 320 is equal to or smaller than Dmax of the parallel-type MCF 20 which is not obliquely polished.

Figure 20:
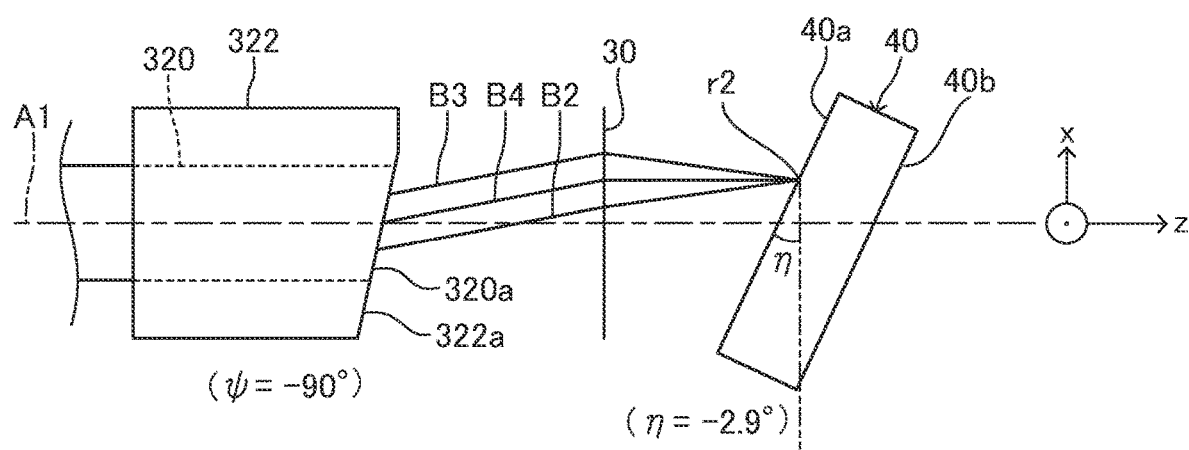
FIG. 20 is a view for illustrating an example of the relative position relationship between the multi-core optical fiber of FIG. 17A and the optical filter in a case of a rotation angle η=−2.9°.

FIG. 20 is a view for illustrating an example of a relative position relationship between the optical filter 40 and the obliquely-polished MCF 320 in the case of the rotation angle η=−2.9°. In this example, the end face 320a is obliquely polished so that the oblique polishing rotation angle ψ becomes −90°.

Figure 21:
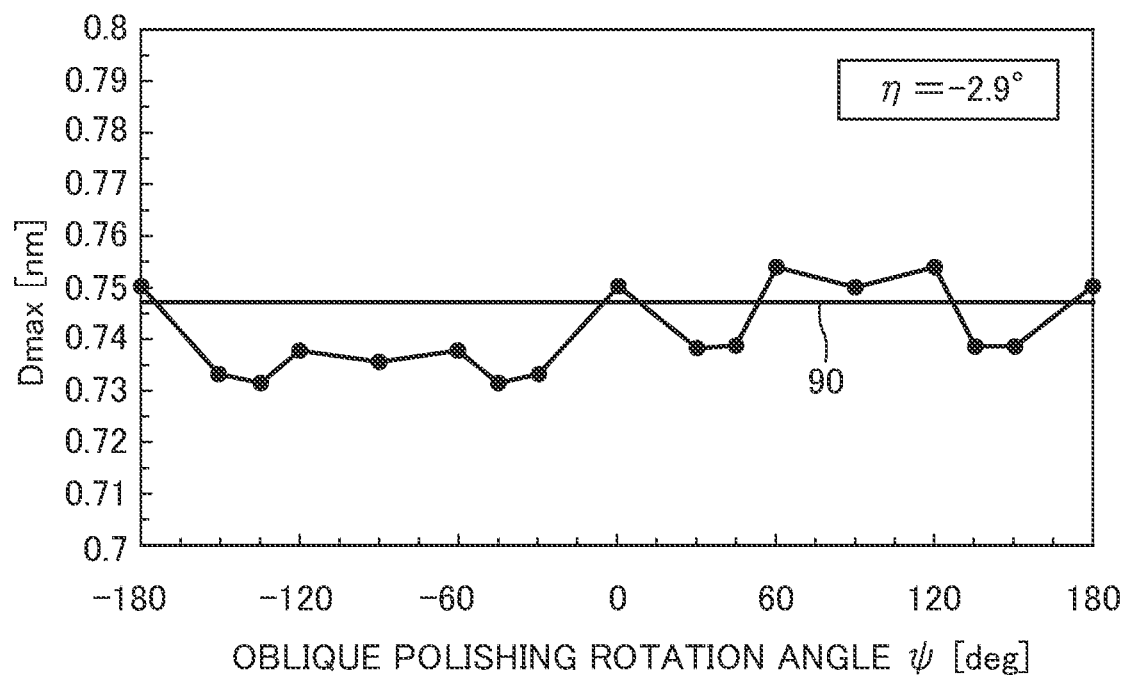
FIG. 21 is a graph for defining the relationship between the oblique polishing rotation angle ψ and the maximum value Dmax of the variation of the multi-core optical fiber of FIG. 17A in the case of the rotation angle η=−2.9°.

FIG. 21 is a graph for defining the relationship between "the oblique polishing rotation angle ψ" and "the maximum value Dmax of the variation" at the time when the oblique polishing rotation angle ψ of the MCF 320 illustrated in FIG. 20 is changed in the range of −180°≤ψ≤180°). With reference to FIG. 21, in a range of −180°≤ψ≤0°, Dmax of the obliquely-polished MCF 320 is equal to or smaller than Dmax of the parallel-type MCF 20 which is not obliquely polished.

Figure 22:
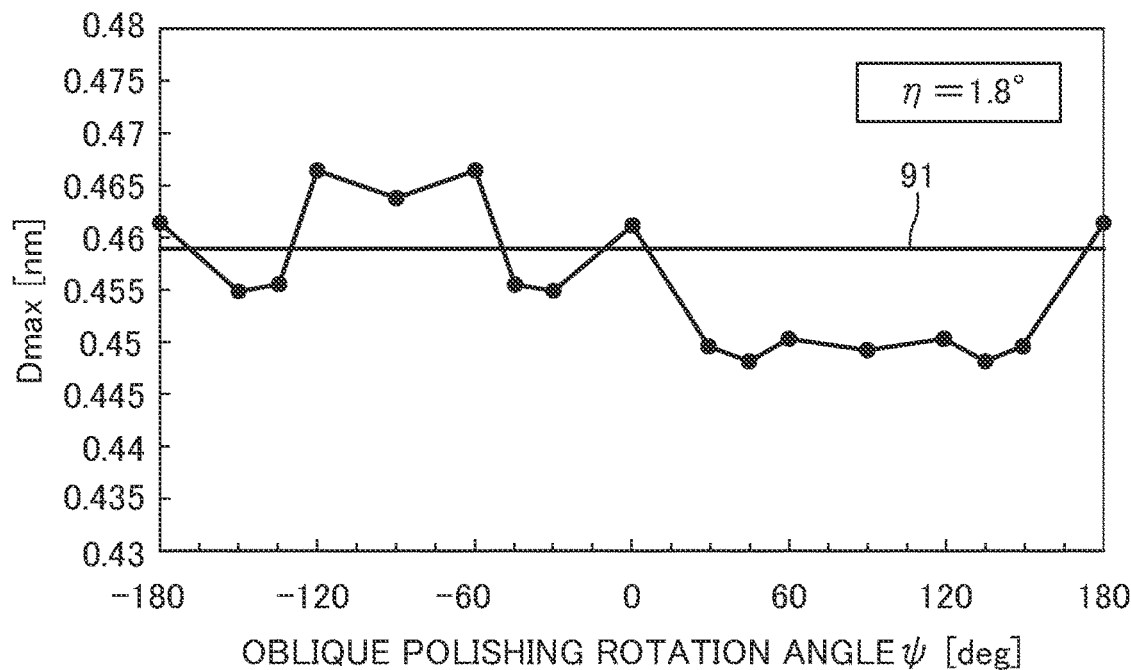
FIG. 22 is a graph for defining the relationship between the oblique polishing rotation angle ψ and the maximum value Dmax of the variation of the multi-core optical fiber of FIG. 17A in a case of a rotation angle η=1.8°.

FIG. 22 is a graph for defining the relationship between "the oblique polishing rotation angle ψ" and "the maximum value Dmax of the variation" at the time when the rotation angle "η" of the optical filter 40 illustrated in FIG. 18 is changed to 1.8°, and when the oblique polishing rotation angle ψ of the MCF 320 is changed in the range of −180°≤ψ≤5180°. In the graph, a solid line 91 indicates the maximum value Dmax of the variation at the time when an MCF having an end face which is not obliquely polished (that is, the MCF 20 of the parallel type in the first embodiment) is used. With reference to FIG. 22, in the range of 0°<ψ≤180°, Dmax of the obliquely-polished MCF 320 is equal to or smaller than Dmax of the parallel-type MCF 20 which is not obliquely polished.

Figure 23:
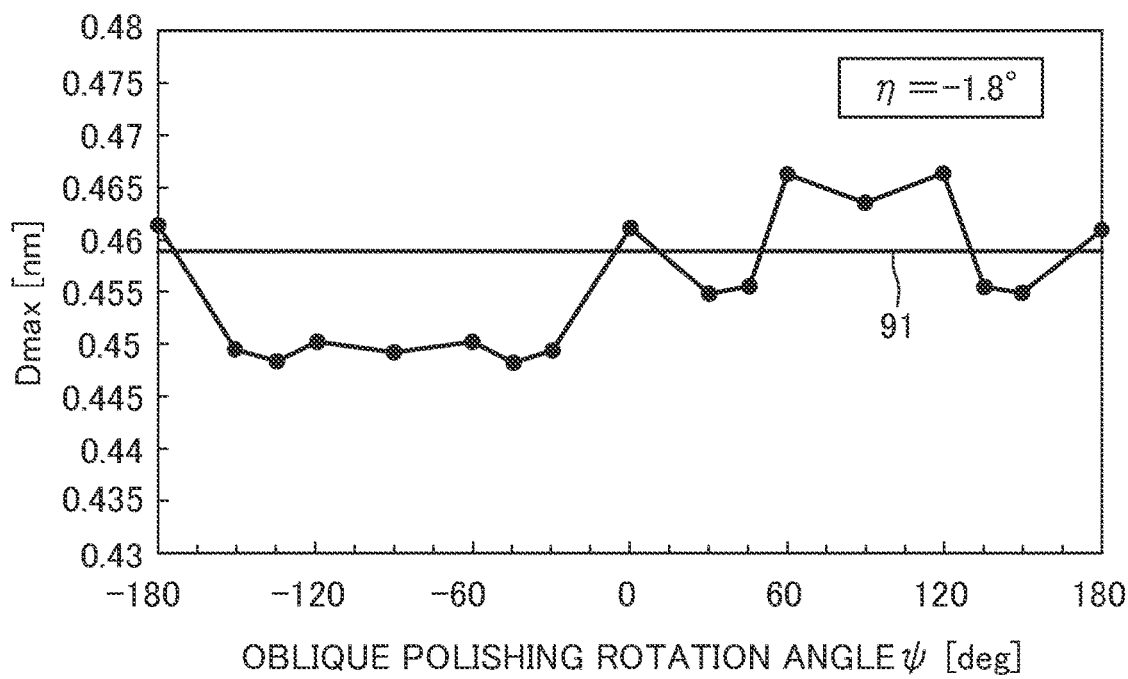
FIG. 23 is a graph for defining the relationship between the oblique polishing rotation angle ψ and the maximum value Dmax of the variation of the multi-core optical fiber of FIG. 17A in a case of a rotation angle η=−1.8°.

FIG. 23 is a graph for defining the relationship between "the oblique polishing rotation angle ψ" and "the maximum value Dmax of the variation" at the time when the rotation angle "η" of the optical filter 40 illustrated in FIG. 20 is changed to −1.8°, and when the oblique polishing rotation angle ψ of the MCF 320 is changed in the range of −180°≤ψ≤180°. With reference to FIG. 23, in the range of −180°≤ψ≤0°, Dmax of the obliquely-polished MCF 320 is equal to or smaller than Dmax of the parallel-type MCF 20 which is not obliquely polished.

It is understood from above that there is a certain tendency between the oblique polishing rotation angle ψ and the maximum value Dmax of the variation. Specifically, it is understood that, when the rotation angles "η" have the same magnitude but different signs, the behaviors of Dmax have line symmetry with each other with respect to ψ=0°. Further, it is understood that, in a case in which the rotation angle "η" has a positive value (see FIG. 19 and FIG. 22), when the MCF 320 is obliquely polished so that the oblique polishing rotation angle ψ satisfies 0°<ψ<180°, the maximum value Dmax of the variation can be equivalently maintained or further reduced. Meanwhile, it is understood that, in a case in which the rotation angle "η" has a negative value (see FIG. 21 and FIG. 23), when the MCF 320 is obliquely polished so that the oblique polishing rotation angle ψ satisfies −180°<ψ<0°, the maximum value Dmax of the variation can be equivalently maintained or further reduced.

Figure 24:
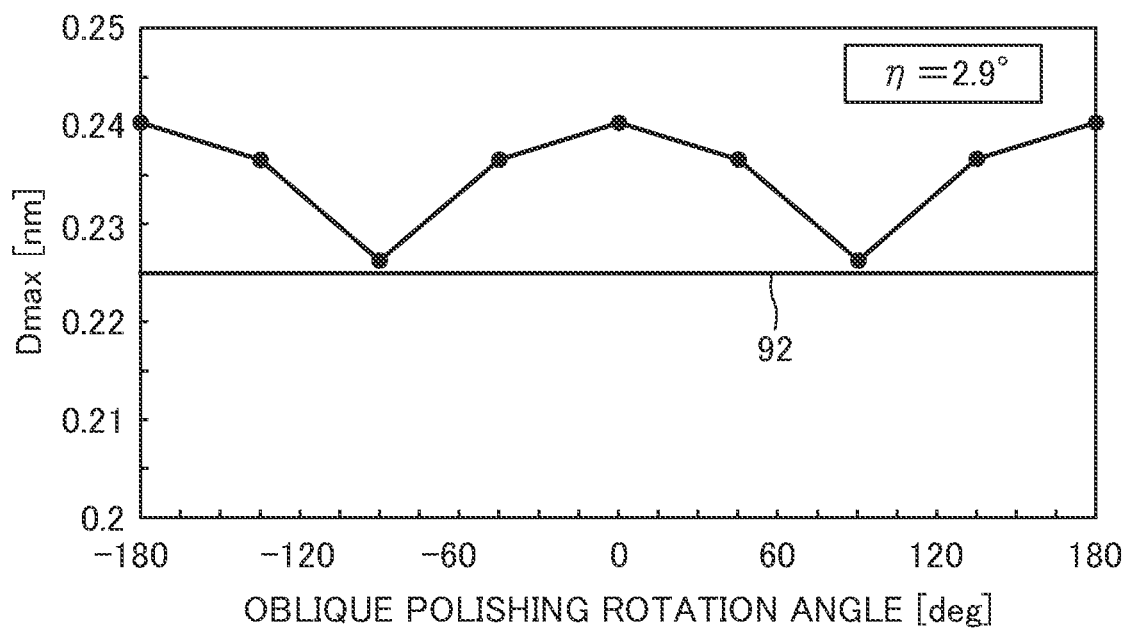
FIG. 24 is a graph for defining the relationship between the oblique polishing rotation angle ψ and the maximum value Dmax of the variation of the multi-core optical fiber of FIG. 17B in the case of the rotation angle η=2.9°.
Figure 25A:
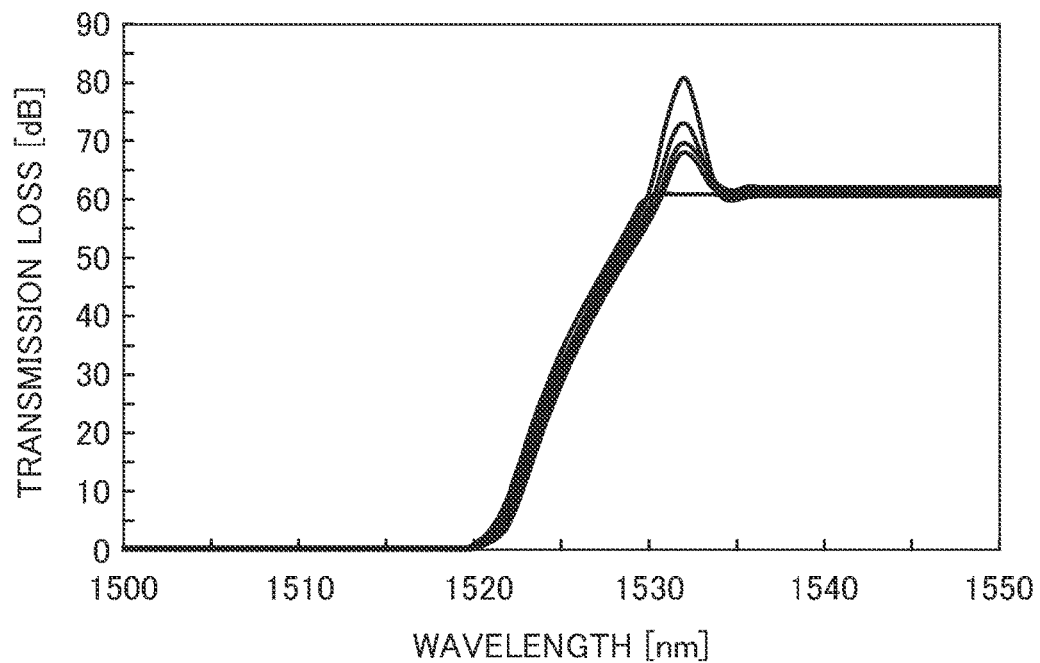
FIG. 25A is a graph for showing transmission loss characteristics of an optical filter device.
Figure 25B:
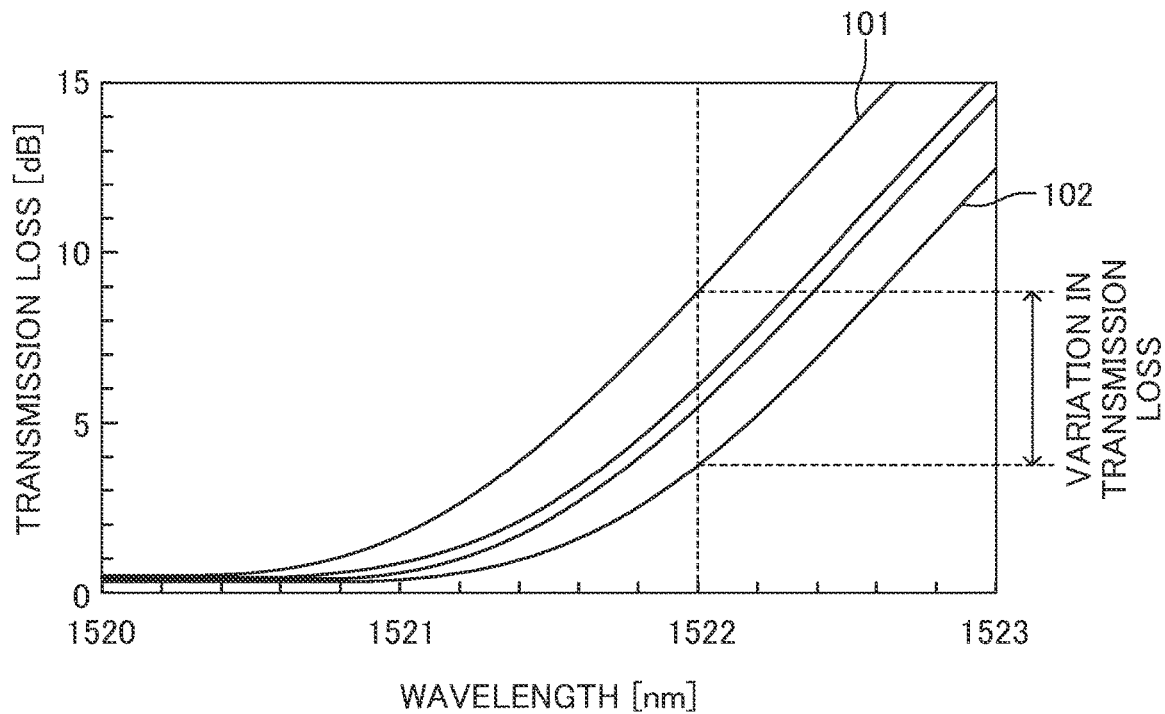
FIG. 25B is a partial enlarged view of the graph of FIG. 25A.

In contrast, FIG. 24 is a graph for defining the relationship between "the oblique polishing rotation angle ψ" and "the maximum value Dmax of the variation" at the time when the oblique polishing rotation angle ψ of the MCF 420 (see FIG. 17B) is changed in the range of −180°≤ψ≤180° in the case of the rotation angle η=2.9°. In the graph, a solid line 92 indicates the maximum value Dmax of the variation at the time when an MCF having an end face which is not obliquely polished (that is, the MCF 220 of the parallel type in the first embodiment (see FIG. 14A and FIG. 14B)) is used. In FIG. 14B, Dmax=0.23 nm is shown, but this is because description is given with two significant figures, and the exact numerical value is slightly smaller than 0.23 nm as indicated by the solid line 92. With reference to FIG. 24, when the rotation angle "η" has a positive value, Dmax of the obliquely-polished MCF 420 is larger than Dmax of the parallel-type MCF 220 which is not obliquely polished.

With reference to the line symmetric property of the behavior of Dmax in the case of using the MCF 320, it is inferred that "the behavior of Dmax at the time of η=−2.9°" in the case of using the MCF 420 is equal to the behavior obtained by flipping "the behavior of Dmax at the time of η=2.9° (see FIG. 24)" with respect to ψ=0°. Here, with reference to FIG. 24, the behavior of Dmax at the time of η=2.9° has line symmetry with respect to ψ=0°. Accordingly, when the MCF 420 is used, it is inferred that "the behavior of Dmax at the time of η=−2.9°" matches "the behavior of Dmax at the time of η=2.9°." It is considered based on this inference that, also when the rotation angle "η" has a negative value, Dmax of the obliquely-polished MCF 420 becomes larger than Dmax of the parallel-type MCF 220 which is not obliquely polished. In other words, it is considered that, when the MCF 420 is obliquely polished, regardless of the sign of the rotation angle "η", the maximum value Dmax of the variation is increased.

It is understood from above that, as in the core arrangement of the MCF 320, in a case in which "the separation distance is larger than zero," when "the MCF 320 is obliquely polished so as to satisfy 0°<ψ<180° at the time of η>0, and the MCF 320 is obliquely polished so as to satisfy −180°<ψ<0° at the time of η<0," the maximum value Dmax of the variation can be equivalently maintained or further reduced as compared to a configuration in which oblique polishing is not performed, but, as in the core arrangement of the MCF 420, in a case in which "the separation distance is zero," such an effect cannot be obtained.

With reference to the above-mentioned consideration results, in a case in which the circumferential orientation of the MCF is set so that the separation distance is minimized (see the first embodiment), when this distance is larger than zero, it is desired that the MCF be obliquely polished within a range of the oblique polishing rotation angle ψ corresponding to the sign of the rotation angle "η" as described above. With this, the maximum value Dmax of the variation can be equivalently maintained or further reduced as compared to the configuration in which oblique polishing is not performed, and hence the optical signal can be appropriately transmitted while the reflected return light is suppressed. Meanwhile, when the separation distance is zero, in order to prevent the maximum value Dmax of the variation from increasing, it is desired that the MCF not be obliquely polished.

The MCF may include inner peripheral cores. Further, the number of cores and the core arrangement of the MCF are not limited to those in the examples given in FIG. 17A and FIG. 17B. Moreover, the core arrangement of the MCF is not required to have the symmetric property with respect to the center of the end face of the MCF. Also in this case, when the MCF is obliquely polished in the oblique polishing direction described above in a case in which the separation distance is larger than zero, the variation in the incident angles "α" can be further reduced, and hence the above-mentioned effect can be provided.

In the above, the optical filter devices according to the embodiments have been described, but the present invention is not limited to the above-mentioned embodiments, and various changes are possible within the range not departing from the object of the present invention.

For example, the optical filter 40 is not limited to the short-wave-pass optical filter, and may be other optical filters for allowing light in a specific wavelength band to pass therethrough at any transmission intensity (for example, a long-wave-pass optical filter, a band-pass optical filter, or a gain equalizing optical filter). When the long-wave-pass optical filter is used as the optical filter, $\lambda_0$ of the above-mentioned analytical expression (1) represents a cut-on wavelength at the time of the incident angle α=0°. When the band-pass optical filter is used as the optical filter, $\lambda_0$ represents a center wavelength at the time of the incident angle α=0°. When the gain equalizing optical filter is used as the optical filter, $\lambda_0$ may be set as appropriate in accordance with a wavelength profile.

Further, in the second embodiment, the end face of the MCF is obliquely polished, and hence variation is caused in the light beam angles "θ" of the light beams exiting from the first lens 30, which have been emitted from the respective cores. Accordingly, the MCF may be moved by a predetermined distance in a direction opposite to the oblique polishing direction so that the variation in the light beam angles "θ" is reduced.

Further, the incident surface 40a of the optical filter 40 is not required to be positioned on a light collecting point of the emission light exiting from the first lens 30. In this case, the rotation axes r1 and r2 of the optical filter 40 can be set as any axis passing through the optical filter 40 in the y-axis direction.

Further, the MCF is not limited to have a columnar shape. For example, the MCF may have a pillar shape in which a cross section orthogonal to the axis is an ellipse or a polygon. In this case, the oblique polishing direction of the MCF is defined as a direction obtained when a direction directed along an "oblique polishing reference axis" from a distal end which is more separated away from the optical filter 40 toward a proximal end which is more proximal to the optical filter 40 is viewed along a center axis of an end face of the MCF. Here, the "oblique polishing reference axis" is a line segment in which "a plane which passes through a center of this end face, is orthogonal to this end face, and is parallel to an inclination direction (direction in which the end face of the MCF is inclined with respect to the xy plane)" intersects with this end face.

Moreover, in the above-mentioned embodiments, the MCF 60 (or the MCF 360) has the same number of cores and the same core arrangement as those of the MCF 20 (or the MCF 320), but the present invention is not limited thereto. The MCF 60 (or the MCF 360) may have the number of cores and the core arrangement different from those of the MCF 20 (or the MCF 320) as long as the MCF 60 (or the MCF 360) includes cores which allow the emission light emitted from each core of the MCF 20 (or the MCF 320) to enter the cores of the MCF 60 (or the MCF 360). For example, the MCF 60 (or the MCF 360) may include one or a plurality of cores in addition to the above-mentioned seven cores.

Similarly, as long as the single-core optical fiber group includes single-mode single-core optical fibers which allow the emission light emitted from each core of the MCF 20 (or the MCF 320) to enter the single-mode single-core optical fibers, the number of single-mode single-core optical fibers may be larger than the number of cores of the MCF 20 (or the MCF 320).

In those cases, there exists at least one core or one single-core optical fiber which the emission light emitted from each of the cores C1 to C7 of the MCF 20 (or the MCF 320) does not enter, but, even with such a configuration, actions and effects similar to those of the first embodiment can be provided.

Moreover, the MCF 20 (or the MCF 320) may be a multi-mode optical fiber. In this case, the MCF 60 (or the MCF 360) may be a multi-mode optical fiber including seven or more cores. As another example, the single-core optical fiber group may include seven or more multi-mode single-core optical fibers.

Moreover, when the single-core optical fiber group is used as the light receiving member, the second lens 50 may be a lens array including the same number of lenses as the number of cores of the MCF 20 (or the MCF 320). Each lens of the lens array converges a light beam emitted from a corresponding core of the MCF 20 (or the MCF 320) so that this light beam enters a corresponding single-core optical fiber.

Moreover, all of the cores C1 to C7 of the MCF 20 (or the MCF 320) are not required to be used for propagation of the light beams. For example, only the cores C1 to C4 may be used for propagation of the light beams, and the cores C5 to C7 are not required to be used for propagation of the light beams. In this case, the MCF 60 (or the MCF 360) is only required to include the number of cores equal to or larger than the number of cores of the MCF 20 (or the MCF 320) that are used for propagation of the light beams. That is, the MCF 60 (or the MCF 360) is not always required to include the number of cores equal to or larger than the number of cores of the MCF 20 (or the MCF 320). As another example, the single-core optical fiber group is only required to include the number of single-core optical fibers equal to or larger than the number of cores of the MCF 20 (or the MCF 320) that are used for propagation of the light beams. That is, the single-core optical fiber group is not always required to include the number of single-core optical fibers equal to or larger than the number of cores of the MCF 20 (or the MCF 320).

REFERENCE SIGNS LIST

10: optical filter device, 20, 120, 220: multi-core optical fiber, 20a, 120a, 220a: end face of multi-core optical fiber, 21, 121, 221: cladding, 22: ferrule, 22a: end face of ferrule, 30: first lens, 40: optical filter, 40a: incident surface, 40b: exit surface 50: second lens, 60: multi-core optical fiber, 60a: end face of multi-core optical fiber

The invention claimed is:

1. An optical filter device, comprising:
a first multi-core optical fiber which has a pillar shape, and includes a plurality of first cores extending along an axial direction, and a common cladding surrounding the plurality of first cores;
a first lens having an optical axis positioned on a center axis of the first multi-core optical fiber, the first lens being configured to collimate a light beam diverging after being emitted from each of the plurality of first cores, and to collect the collimated light beams which have been emitted from the plurality of first cores, respectively;
an optical filter having a first surface which light beams exiting from the first lens enter and on which a light collecting point of emission light exiting from the first lens is positioned, and a second surface which is opposed to the first surface, and from which the light beams passing through the optical filter exit, the optical filter being configured to allow a light beam in a specific wavelength band to pass therethrough at any transmission intensity, the optical filter being rotated by a predetermined rotation angle about a rotation axis extending in a specific direction perpendicular to the optical axis of the first lens at said light collecting point at which the light beams are collected on the first surface, from a position at which the first surface is parallel to a plane orthogonal to the optical axis;
a second lens configured to converge each of the light beams exiting from the optical filter, which have been emitted from the plurality of first cores, respectively; and
a second optical fiber extending along the axial direction, said second optical fiber having a pillar shape, and including cores which all of the light beams exiting from the second lens, which have been emitted from the plurality of first cores, respectively, enter,
wherein, when a direction directed from a reference axis which passes through the optical axis and is parallel to the rotation axis toward one side with respect to the reference axis along an orthogonal axis orthogonal to the optical axis and the reference axis is defined as a first orthogonal direction, and a direction directed from the reference axis toward another side with respect to the reference axis along the orthogonal axis is defined as a second orthogonal direction,
a circumferential orientation of the first multi-core optical fiber is set so that, when an end face of the first multi-core optical fiber is viewed along the center axis of the first multi-core optical fiber, a separation distance is minimized, the separation distance being a sum of a distance from the reference axis to a first core that is most separated away from the reference axis in the first orthogonal direction and a distance from the reference axis to a first core that is most separated away from the reference axis in the second orthogonal direction.

2. The optical filter device according to claim 1,
wherein the plurality of first cores include a plurality of surrounding cores each extending along an axis excluding the center axis of the first multi-core optical fiber,
wherein, when the end face of the first multi-core optical fiber is viewed along the center axis of the first multi-core optical fiber,
the plurality of surrounding cores are arranged along a straight line passing through a center of the end face, or a plurality of outermost peripheral cores of the plurality of surrounding cores, which are most separated away from the center, are positioned at vertices of a regular polygon having the center as a center, and
wherein the plurality of surrounding cores arranged in a straight line shape or the plurality of outermost peripheral cores have line symmetry with respect to the reference axis and are prevented from being positioned on the orthogonal axis.

3. The optical filter device according to claim 1,
wherein the second optical fiber is a second multi-core optical fiber in which the cores are surrounded by a common cladding, and
wherein the second lens is configured to refract the light beams exiting from the optical filter, which have been emitted from the plurality of first cores, respectively, so that principal rays of the light beams are parallel to each other.

4. The optical filter device according to claim 1,
wherein the second optical fiber is a single-core optical fiber group including a plurality of single-core optical fibers, and
wherein each of the plurality of single-core optical fibers includes one core serving as the core, and a cladding surrounding the one core.

5. The optical filter device according to claim 1, wherein a magnitude of the predetermined rotation angle of the optical filter is larger than 0° and smaller than 90°.

6. The optical filter device according to claim 1,
wherein the end face of the first multi-core optical fiber is obliquely polished so as to be inclined by a predetermined polishing angle in a predetermined inclination direction with respect to the plane orthogonal to the optical axis, and
wherein, when:
it is defined that a z-axis extends on the optical axis so that a direction directed from the first lens toward the optical filter is a positive direction, a y-axis extends on the reference axis so that a direction directed from one end of the reference axis toward another end of the reference axis is a positive direction, and an x-axis extends in the first orthogonal direction and the second orthogonal direction;
it is defined that, in a case in which the optical filter is viewed from the positive direction of the y-axis, the predetermined rotation angle at a time when the optical filter is rotated counterclockwise about the rotation axis has a positive value, and the predetermined rotation angle at a time when the optical filter is rotated clockwise about the rotation axis has a negative value; and
it is defined that a direction obtained when a direction directed along an oblique polishing reference axis from a distal end which is more separated away from the optical filter toward a proximal end which is more proximal to the optical filter is viewed along a center axis of the end face of the first multi-core optical fiber is an oblique polishing direction, and an angle formed counterclockwise from the positive direction of the y-axis by the oblique polishing direction is an oblique polishing rotation angle having a positive value, the oblique polishing reference axis being a line segment in which a plane which passes through a center of the end face of the first multi-core optical fiber, is orthogonal to the end face, and is parallel to the predetermined inclination direction intersects with the end face, in a case in which the separation distance is larger than 0,
when the predetermined rotation angle of the optical filter has a positive value, the end face of the first multi-core optical fiber is obliquely polished so that the oblique polishing rotation angle takes a value that is larger than 0° and smaller than 180°, and
when the predetermined rotation angle of the optical filter has a negative value, the end face of the first multi-core optical fiber is obliquely polished so that the oblique polishing rotation angle takes a value that is larger than −180° and smaller than 0°.

\* \* \* \* \*